US012309828B2

(12) United States Patent
Chen et al.

(10) Patent No.: US 12,309,828 B2
(45) Date of Patent: May 20, 2025

(54) DATA TRANSMISSION METHOD AND APPARATUS

(71) Applicant: Huawei Technologies Co., Ltd., Shenzhen (CN)

(72) Inventors: Erkai Chen, Shanghai (CN); Zhengzheng Xiang, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 493 days.

(21) Appl. No.: 17/738,261

(22) Filed: May 6, 2022

(65) Prior Publication Data
US 2022/0264596 A1 Aug. 18, 2022

Related U.S. Application Data

(63) Continuation of application No. PCT/CN2019/116765, filed on Nov. 8, 2019.

(51) Int. Cl.
*H04W 72/56* (2023.01)
*H04L 5/00* (2006.01)
(Continued)

(52) U.S. Cl.
CPC ......... *H04W 72/569* (2023.01); *H04L 5/0044* (2013.01); *H04L 5/0053* (2013.01); *H04W 72/20* (2023.01)

(58) Field of Classification Search
CPC .. H04W 72/569; H04W 72/20; H04L 5/0044; H04L 5/0053; H04L 5/0064; H04L 1/1671
See application file for complete search history.

(56) References Cited

U.S. PATENT DOCUMENTS 11,039,426 B2 * 6/2021 Baghel ................. H04L 5/0044
11,356,212 B2 * 6/2022 Park ..................... H04W 72/20
(Continued)

FOREIGN PATENT DOCUMENTS

CN 109075908 A 12/2018
CN 109691146 A 4/2019
(Continued)

OTHER PUBLICATIONS

"Physical Layer Procedures for NR V2X Sidelink Design," Source: Intel Corporation, Agenda item: 7.2.4.1.2, Document for: Discussion and Decision, 3GPP TSG RAN WG1 RAN1#96, R1-1903450 (revision of R1-1902482), Athens, Greece, Feb. 25 to Mar. 1, 2019, 14 pages.

(Continued)

Primary Examiner — Mounir Moutaouakil
(74) Attorney, Agent, or Firm — SLATER MATSIL, LLP

(57) ABSTRACT

A data transmission method and an apparatus, the method including determining, by a first terminal apparatus, a priority of uplink data carried on a physical uplink shared channel (PUSCH), a priority of first sidelink data carried on a physical sidelink shared channel (PSSCH), and a priority of sidelink feedback control information (SFCI) carried on a physical sidelink feedback channel (PSFCH), where the PUSCH, the PSSCH, and the PSFCH occupy a same slot; and sending, by the first terminal apparatus, at least one of the uplink data through the PUSCH, or the first sidelink data through the PSSCH, or the SFCI through the PSFCH based on the priority of the uplink data, the priority of the first sidelink data, and the priority of the SFCI.

16 Claims, 7 Drawing Sheets

(51) Int. Cl.
*H04W 72/20* (2023.01)
*H04W 72/566* (2023.01)

(56) References Cited

U.S. PATENT DOCUMENTS

| | | | | |
|---|---|---|---|---|
| 11,424,801 | B2* | 8/2022 | Taherzadeh Boroujeni | ................ H04W 76/27 |
| 11,533,695 | B2* | 12/2022 | Khoryaev | ............... H04W 4/40 |
| 11,533,722 | B2* | 12/2022 | Zhao | ................. H04W 72/0446 |
| 11,539,475 | B2* | 12/2022 | Park | ..................... H04L 1/1864 |
| 11,665,655 | B2* | 5/2023 | Ryu | ................... H04W 56/001 370/350 |
| 11,677,508 | B2* | 6/2023 | Xue | ..................... H04L 1/1896 370/329 |
| 11,895,703 | B2* | 2/2024 | Lee | ....................... H04W 76/14 |
| 11,968,667 | B2* | 4/2024 | Zhang | .................. H04W 72/20 |
| 12,004,055 | B2* | 6/2024 | Hwang | ................ H04W 92/18 |
| 12,021,634 | B2* | 6/2024 | Hosseini | ............... H04L 5/0055 |
| 12,047,931 | B2* | 7/2024 | Wang | ................... H04W 72/20 |
| 12,137,398 | B2* | 11/2024 | Su | .......................... H04W 72/04 |
| 2020/0196255 | A1* | 6/2020 | Cheng | ................... H04L 5/0092 |
| 2020/0196365 | A1 | 6/2020 | Tang et al. | |
| 2021/0274327 | A1 | 9/2021 | Zhao | |
| 2022/0030598 | A1 | 1/2022 | Li | |
| 2024/0244545 | A1* | 7/2024 | Cheng | ................... H04L 5/0033 |

FOREIGN PATENT DOCUMENTS

| | | |
|---|---|---|
| EP | 3425837 A1 | 1/2019 |
| WO | 2019127968 A1 | 7/2019 |
| WO | 2019195505 A1 | 10/2019 |
| WO | 2021068159 A1 | 4/2021 |

OTHER PUBLICATIONS

"Sidelink Physical Layer Structure for NR V2X," Agenda Item: 7.2.4.1.1, Source: Huawei, HiSilicon, Document for: Discussion and decision, 3GPP TSG RAN WG1 Meeting #97, R1-1906007, Reno, USA, May 13-17, 2019, 18 pages.

"Discussion on Sidelink Structure in NR V2X," Agenda Item: 7.2.4.1, Source: ASUSTeK, Document for: Discussion and Decision, 3GPP TSG RAN WG1 #97, R1-1907367, Reno, USA, May 13-17, 2019, 6 pages.

* cited by examiner

DATA TRANSMISSION METHOD AND APPARATUS

CROSS-REFERENCE TO RELATED APPLICATIONS

This application is a continuation of International Application No. PCT/CN2019/116765, filed on Nov. 8, 2019, the disclosure of which is hereby incorporated by reference in its entirety.

TECHNICAL FIELD

Embodiments of this application relate to the field of communication technologies, and in particular, to a data transmission method and an apparatus.

BACKGROUND

In a next-generation new radio (NR)—based vehicle-to-everything (V2X) communication system, a terminal apparatus may perform air-interface communication with network side devices such as a base station through an uplink (UL), and may also perform sidelink communication with another terminal apparatus through a sidelink (SL). For example, the terminal apparatus may send uplink data to the base station through a physical uplink shared channel (PUSCH) on the UL, and may also send sidelink data to the another terminal apparatus through a physical sidelink shared channel (PSSCH) on the SL. Alternatively, to improve reliability of the sidelink communication and reduce a communication latency, after receiving sidelink data sent by the another terminal apparatus, the terminal apparatus sends sidelink feedback control information (SFCI) corresponding to the received sidelink data to the another terminal apparatus through a physical sidelink feedback channel (fPSFCH) on the SL.

In a slot, the terminal apparatus may need to send the uplink data through the PUSCH on the UL, and need to send the sidelink data through the PSSCH and the SFCI or the like through the PSFCH on the SL. However, usually, the terminal device can choose to send data on only one of the links in a same slot. For example, the terminal apparatus chooses to send the uplink data through the PUSCH on the UL, or chooses to send the sidelink data through the PSSCH and/or the SFCI through the PSFCH on the SL. However, when the PUSCH, the PSSCH, and the PSFCH may occupy a same slot to send data, a solution to selecting a specific channel to send data in the slot has not been provided in a conventional technology. This reduces communication efficiency.

SUMMARY

Embodiments of this application provide a data transmission method and an apparatus, to select, when a PUSCH, a PSSCH, and a PSFCH are simultaneously transmitted in a same slot, a specific channel to send data in the slot, and therefore to improve communication efficiency.

To achieve the foregoing objective, the following technical solutions are used in embodiments of this application.

According to a first aspect, a data transmission method is provided. The method may include a first terminal apparatus determines a priority of uplink data carried on a PUSCH, a priority of first sidelink data carried on a PSSCH, and a priority of SFCI carried on a PSFCH, where the PUSCH, the PSSCH, and the PSFCH occupy a same slot. The first terminal apparatus sends the uplink data through the PUSCH, or the first sidelink data through the PSSCH and/or the SFCI through the PSFCH based on the priority of the uplink data, the priority of the first sidelink data, and the priority of the SFCI.

Based on the method according to the first aspect, when the PUSCH, the PSSCH, and the PSFCH occupy the same slot, the first terminal apparatus may determine, based on the priority of the uplink data to be transmitted on a UL, the priority of the sidelink data to be transmitted on an SL, and the priority of the SFCI to be transmitted on the SL, to send the uplink data on the UL or to send the sidelink data and/or the SFCI on the SL. When the PUSCH, the PSSCH, and the PSFCH are simultaneously transmitted in the same slot, this helps the terminal apparatus to select the UL or the SL to send data, to improve communication efficiency.

In a possible design, with reference to the first aspect, that the first terminal apparatus sends the uplink data through the PUSCH, or the first sidelink data through the PSSCH and/or the SFCI through the PSFCH based on the priority of the uplink data, the priority of the first sidelink data, and the priority of the SFCI includes when the priority of the uplink data is lower than a first threshold, sending the uplink data through the PUSCH, or when the priority of the uplink data is not lower than a first threshold, sending the first sidelink data through the PSSCH and/or the SFCI through the PSFCH based on the priority of the first sidelink data and the priority of the SFCI.

Based on the possible design, when the priority of the uplink data is lower than the first threshold, that is, the uplink data is UL emergency service data, the uplink data may be sent on the UL. When the priority of the uplink data is not lower than the first threshold, that is, the uplink data is UL non-emergency service data, it is considered to send the sidelink data and/or the SFCI on the SL. In this way, when the data to be sent on the UL has a higher emergency degree or a higher priority, the uplink data may be preferentially sent, to ensure that the emergency service data on the UL can be sent to a network device in time. Further, when the data to be sent on the UL is non-emergency, it is considered to send the sidelink data and/or the SFCI on the SL, to improve resource utilization.

In a possible design, with reference to the first aspect or the possible design of the first aspect, the sending the first sidelink data through the PSSCH and/or the SFCI through the PSFCH based on the priority of the first sidelink data and the priority of the SFCI includes determining a priority of a sidelink based on the priority of the first sidelink data and the priority of the SFCI, and when the priority of the sidelink is lower than a second threshold, sending the first sidelink data through the PSSCH, and sending the SFCI through the PSFCH, or when the priority of the sidelink is not lower than a second threshold, sending the uplink data through the PUSCH.

Based on the possible design, the link priority of the SL is obtained in comprehensive consideration of the priority of the first sidelink data and the priority of the SFCI. The sidelink data and the SFCI are sent when the link priority is lower than the second threshold and SL emergency service data exists on the SL. This ensures that the SL emergency service data on the SL is sent to a peer end in time. The sidelink data and the SFCI may be further bound together for sending in the same slot, to improve transmission resource utilization and transmission efficiency on the SL.

In a possible design, with reference to the first aspect or the possible designs of the first aspect, the priority of the sidelink is the priority of the first sidelink data, the priority of the sidelink is the priority of the SFCI, the priority of the sidelink is a higher priority in the priority of the first sidelink data and the priority of the SFCI, or the priority of the sidelink is a lower priority in the priority of the first sidelink data and the priority of the SFCI.

Based on the possible design, the priority of the first sidelink data or the priority of the SFCI may be used as the priority of the sidelink, that is, whether to send the sidelink data and the SFCI on the SL is determined based on the priority of the first sidelink data or the priority of the SFCI. Alternatively, the higher priority in the priority of the first sidelink data and the priority of the SFCI may be used as the priority of the sidelink, and whether to send the sidelink data and the SFCI on the SL is determined based on data with a higher emergency degree to be sent on the SL. Alternatively, the lower priority in the priority of the first sidelink data and the priority of the SFCI may be used as the priority of the sidelink, and whether to send the sidelink data and the SFCI on the SL is determined based on data with a lower emergency degree to be sent on the SL. Design manners are flexible and diversified.

In a possible design, with reference to the first aspect or the possible design of the first aspect, the sending the first sidelink data through the PSSCH and/or the SFCI through the PSFCH based on the priority of the first sidelink data and the priority of the SFCI includes when the priority of the first sidelink data is lower than a second threshold, and the priority of the SFCI is not lower than the second threshold, sending the first sidelink data through the PSSCH, when the priority of the first sidelink data is not lower than a second threshold, and the priority of the SFCI is lower than the second threshold, sending the SFCI through the PSFCH, when the priority of the first sidelink data is lower than a second threshold, and the priority of the SFCI is lower than the second threshold, sending the first sidelink data through the PSSCH, and sending the SFCI through the PSFCH, or when the priority of the first sidelink data is not lower than a second threshold, and the priority of the SFCI is not lower than the second threshold, sending the uplink data through the PUSCH.

Based on the possible design, it is considered to separately compare the priority of the sidelink data and the priority of the SFCI with the second threshold when the sidelink data or the SFCI is to be sent on the SL, to send data whose priority is lower than the second threshold, that is, send data with a higher emergency degree on the SL. This ensures that SL emergency service data is sent to a peer end in time, to improve quality of data transmission on the SL.

In a possible design, with reference to the first aspect or the possible designs of the first aspect, when the priority of the uplink data is lower than the first threshold, the uplink data is uplink UL emergency service data. Alternatively, when the priority of the first sidelink data is lower than the second threshold, the first sidelink data is sidelink SL emergency service data. Alternatively, the SFCI includes information used to indicate whether the first terminal apparatus has correctly received second sidelink data, and when the priority of the SFCI is lower than the second threshold, the second sidelink data is SL emergency service data.

Based on the possible design, an emergency degree of data on the UL may be distinguished by using the first threshold as a demarcation line. For example, uplink data whose priority is lower than the first threshold is the UL emergency service data. An emergency degree of data on the SL may be distinguished by using the second threshold as a demarcation line. For example, uplink data whose priority is lower than the second threshold is the SL emergency service data. In this way, it is determined through comparison with the thresholds whether the data on the UL or the SL is emergency service data or non-emergency service data. This is simple and easy to implement.

In a possible design, with reference to the first aspect or the possible designs of the first aspect, the method further includes the first terminal apparatus receives, from a second terminal apparatus, the second sidelink data and sidelink control information used to indicate a priority of the second sidelink data, and determines the priority of the SFCI based on the priority of the second sidelink data.

Based on the possible design, a priority of SFCI corresponding to sidelink data may be determined based on a priority of the sidelink data. This is simple and easy to implement. In addition, an emergency degree of the feedback information is consistent with that of the sidelink data, to ensure that SFCI of the SL emergency service data can be fed back in time, thereby improving the communication efficiency.

According to a second aspect, this application provides a communication apparatus. The communication apparatus may be a first terminal apparatus or a chip or a system-on-a-chip in the first terminal apparatus, or may be a functional module that is in the first terminal apparatus and that is configured to implement the method according to any one of the first aspect or the possible designs of the first aspect. The terminal apparatus may implement functions performed by the first terminal apparatus in the foregoing aspect or the possible designs, and the functions may be implemented by hardware executing corresponding software. The hardware or the software includes one or more modules corresponding to the foregoing functions. For example, the communication apparatus includes a processing unit and a sending unit.

The processing unit is configured to determine a priority of uplink data carried on a PUSCH, a priority of first sidelink data carried on a PSSCH, and a priority of SFCI carried on a PSFCH, where the PUSCH, the PSSCH, and the PSFCH occupy a same slot.

The sending unit is configured to send the uplink data through the PUSCH, or the first sidelink data through the PSSCH and/or the SFCI through the PSFCH based on the priority of the uplink data, the priority of the first sidelink data, and the priority of the SFCI.

For a specific implementation of the terminal apparatus, refer to a behavior function of the first terminal apparatus in the data transmission method according to any one of the first aspect or the possible designs of the first aspect. Based on the second aspect, when the PUSCH, the PSSCH, and the PSFCH occupy the same slot, it may be determined, based on the priority of the uplink data to be transmitted on a UL, the priority of the sidelink data to be transmitted on an SL, and the priority of the SFCI to be transmitted on the SL, to send the uplink data on the UL or to send the sidelink data and/or the SFCI on the SL. When the PUSCH, the PSSCH, and the PSFCH are simultaneously transmitted in the same slot, this helps the terminal apparatus to select the UL or the SL to send data, to improve communication efficiency.

In a possible design, with reference to the second aspect, the sending unit is specifically configured to when the priority of the uplink data is lower than a first threshold, send the uplink data through the PUSCH, or when the priority of the uplink data is not lower than a first threshold, send the first sidelink data through the PSSCH and/or the SFCI through the PSFCH based on the priority of the first sidelink data and the priority of the SFCI.

Based on the possible design, when the priority of the uplink data is lower than the first threshold, that is, the uplink data is UL emergency service data, the uplink data may be sent on the UL. When the priority of the uplink data is not lower than the first threshold, that is, the uplink data is UL non-emergency service data, it is considered to send the sidelink data and/or the SFCI on the SL. In this way, when the data to be sent on the UL has a higher emergency degree or a higher priority, the uplink data may be preferentially sent, to ensure that the emergency service data on the UL can be sent to a network device in time. Further, when the data to be sent on the UL is non-emergency, it is considered to send the sidelink data and/or the SFCI on the SL, to improve resource utilization.

In a possible design, with reference to the second aspect or the possible design of the second aspect, the processing unit is further configured to determine a priority of a sidelink based on the priority of the first sidelink data and the priority of the SFCI. The sending unit is specifically configured to when the priority of the sidelink is lower than a second threshold, send the first sidelink data through the PSSCH, and send the SFCI through the PSFCH, or when the priority of the sidelink is not lower than a second threshold, send the uplink data through the PUSCH.

Based on the possible design, the link priority of the SL is obtained in comprehensive consideration of the priority of the first sidelink data and the priority of the SFCI. The sidelink data and the SFCI are sent when the link priority is lower than the second threshold and SL emergency service data exists on the SL. This ensures that the SL emergency service data on the SL is sent to a peer end in time. The sidelink data and the SFCI may be further bound together for sending in the same slot, to improve transmission resource utilization and transmission efficiency on the SL.

In a possible design, with reference to the second aspect or the possible designs of the second aspect, the priority of the sidelink is the priority of the first sidelink data, the priority of the sidelink is the priority of the SFCI, the priority of the sidelink is a higher priority in the priority of the first sidelink data and the priority of the SFCI, or the priority of the sidelink is a lower priority in the priority of the first sidelink data and the priority of the SFCI.

Based on the possible design, the priority of the first sidelink data or the priority of the SFCI may be used as the priority of the sidelink, that is, whether to send the sidelink data and the SFCI on the SL is determined based on the priority of the first sidelink data or the priority of the SFCI. Alternatively, the higher priority in the priority of the first sidelink data and the priority of the SFCI may be used as the priority of the sidelink, and whether to send the sidelink data and the SFCI on the SL is determined based on data with a higher emergency degree to be sent on the SL. Alternatively, the lower priority in the priority of the first sidelink data and the priority of the SFCI may be used as the priority of the sidelink, and whether to send the sidelink data and the SFCI on the SL is determined based on data with a lower emergency degree to be sent on the SL. Design manners are flexible and diversified.

In a possible design, with reference to the second aspect or the possible design of the second aspect, the sending unit is specifically configured to when the priority of the first sidelink data is lower than a second threshold, and the priority of the SFCI is not lower than the second threshold, send the first sidelink data through the PSSCH, when the priority of the first sidelink data is not lower than a second threshold, and the priority of the SFCI is lower than the second threshold, send the SFCI through the PSFCH, when the priority of the first sidelink data is lower than a second threshold, and the priority of the SFCI is lower than the second threshold, send the first sidelink data through the PSSCH, and send the SFCI through the PSFCH, or when the priority of the first sidelink data is not lower than a second threshold, and the priority of the SFCI is not lower than the second threshold, send the uplink data through the PUSCH.

Based on the possible design, it is considered to separately compare the priority of the sidelink data and the priority of the SFCI with the second threshold when the sidelink data or the SFCI is to be sent on the SL, to send data whose priority is lower than the second threshold, that is, send data with a higher emergency degree on the SL. This ensures that SL emergency service data is sent to a peer end in time, to improve quality of data transmission on the SL.

In a possible design, with reference to the second aspect or the possible designs of the second aspect, when the priority of the uplink data is lower than the first threshold, the uplink data is uplink UL emergency service data. Alternatively, when the priority of the first sidelink data is lower than the second threshold, the first sidelink data is sidelink SL emergency service data. Alternatively, the SFCI includes information used to indicate whether the first terminal apparatus has correctly received second sidelink data, and when the priority of the SFCI is lower than the second threshold, the second sidelink data is SL emergency service data.

Based on the possible design, an emergency degree of data on the UL may be distinguished by using the first threshold as a demarcation line. For example, uplink data whose priority is lower than the first threshold is the UL emergency service data. An emergency degree of data on the SL may be distinguished by using the second threshold as a demarcation line. For example, uplink data whose priority is lower than the second threshold is the SL emergency service data. In this way, it is determined through comparison with the thresholds whether the data on the UL or the SL is emergency service data or non-emergency service data. This is simple and easy to implement.

In a possible design, with reference to the second aspect or the possible designs of the second aspect, the communication apparatus further includes a receiving unit, configured to receive, from a second terminal apparatus, the second sidelink data and sidelink control information used to indicate a priority of the second sidelink data. The processing unit is further configured to determine the priority of the SFCI based on the priority of the second sidelink data.

Based on the possible design, a priority of SFCI corresponding to sidelink data may be determined based on a priority of the sidelink data. This is simple and easy to implement. In addition, an emergency degree of the feedback information is consistent with that of the sidelink data, to ensure that SFCI of the SL emergency service data can be fed back in time, thereby improving the communication efficiency.

According to a third aspect, a communication apparatus is provided. The communication apparatus may be a first terminal apparatus or a chip or a system-on-a-chip in the first terminal apparatus. The communication apparatus may implement functions performed by the first terminal apparatus in the foregoing aspect or the possible designs, and the functions may be implemented by hardware. For example, in a possible design, the communication apparatus may include a processor and a transceiver. The processor is configured to determine a priority of uplink data carried on a PUSCH, a priority of first sidelink data carried on a PSSCH, and a priority of SFCI carried on a PSFCH, where the PUSCH, the PSSCH, and the PSFCH occupy a same slot, and trigger, based on the priority of the uplink data, the priority of the first sidelink data, and the priority of the SFCI, the transceiver to send the uplink data through the PUSCH or to send the first sidelink data through the PSSCH and/or the SFCI through the PSFCH. In another possible design, the terminal apparatus may further include a memory, where the memory is configured to store computer-executable instructions and data that are necessary for the terminal apparatus. When the terminal apparatus runs, the processor executes the computer-executable instructions stored in the memory, to enable the terminal apparatus to perform the data transmission method according to any one of the first aspect or the possible designs of the first aspect.

According to a fourth aspect, a computer-readable storage medium is provided. The computer-readable storage medium may be a readable non-volatile storage medium. The computer-readable storage medium stores computer instructions or a program. When the computer instructions or the program are/is run on a computer, the computer is enabled to perform the data transmission method according to any one of the first aspect or the possible designs of the foregoing aspect.

According to a fifth aspect, a computer program product including instructions is provided. When the computer program product runs on a computer, the computer is enabled to perform the data transmission method according to any one of the first aspect or the possible designs of the foregoing aspect.

According to a sixth aspect, a communication apparatus is provided. The communication apparatus may be a first terminal apparatus or a chip or a system-on-a-chip in the first terminal apparatus, and the communication apparatus includes one or more processors and one or more memories. The one or more memories are coupled to the one or more processors, and are configured to store computer program code, and the computer program code includes computer instructions. When the one or more processors execute the computer instructions, the terminal apparatus is enabled to perform the data transmission method according to any one of the first aspect or the possible designs of the first aspect.

For technical effects achieved by any one of the design manners of the third aspect to the sixth aspect, refer to the technical effects achieved by any one of the first aspect or the possible designs of the first aspect. Details are not described again.

According to a seventh aspect, another data transmission method is provided. The method includes a second terminal apparatus sends, to a first terminal apparatus, second sidelink data and sidelink control information used to indicate a priority of the second sidelink data, where the priority of the second sidelink data is used to determine a priority of sidelink feedback control information SFCI, and the SFCI includes information used to indicate whether the first terminal apparatus has correctly received the second sidelink data.

Based on the possible design, when sending sidelink data to the first terminal apparatus, the second terminal apparatus may send a priority of the sidelink data to the first terminal apparatus, so that the first terminal apparatus determines, based on the received priority of the sidelink data, a priority that is of SFCI and that corresponds to the priority of the sidelink data, and further determines, based on the priority of the SFCI, an emergency degree of data to be transmitted on an SL, to ensure that data with a higher emergency degree on the SL is preferentially sent to a peer end. This improves communication efficiency.

In a possible design, with reference to the seventh aspect, the method further includes the second terminal apparatus receives the SFCI from the first terminal apparatus through a physical sidelink feedback channel PSFCH, and/or receives first sidelink data from the first terminal apparatus through a physical sidelink shared channel PSSCH, where the PSSCH and the PSFCH occupy a same slot.

Based on the possible design, the second terminal apparatus may receive, in the same slot, sidelink data and SFCI corresponding to other sidelink data, to improve resource utilization.

In a possible design, with reference to the seventh aspect or the possible design of the seventh aspect, that the second terminal apparatus receives the SFCI from the first terminal apparatus through a physical sidelink feedback channel PSFCH, and/or receives first sidelink data from the first terminal apparatus through a physical sidelink shared channel PSSCH includes when a priority of the first sidelink data is not lower than a second threshold, and the priority of the SFCI is lower than the second threshold, the second terminal apparatus receives the SFCI from the first terminal apparatus through the PSFCH. Alternatively, when a priority of the first sidelink data is lower than a second threshold, and the priority of the SFCI is higher than the second threshold, the second terminal apparatus receives the first sidelink data from the first terminal apparatus through the PSSCH. Alternatively, when a priority of the first sidelink data is lower than a second threshold, and the priority of the SFCI is lower than the second threshold, the second terminal apparatus receives the SFCI from the first terminal apparatus through the PSFCH, and receives the first sidelink data from the first terminal apparatus through the PSSCH. Alternatively, when a priority of a sidelink is lower than a second threshold, the second terminal apparatus receives the SFCI from the first terminal apparatus through the PSFCH, and receives the first sidelink data from the first terminal apparatus through the PSSCH, where the priority of the sidelink is determined based on a priority of the first sidelink data and the priority of the SFCI.

Based on the possible design, the second terminal apparatus may receive data with a higher emergency degree from the first terminal apparatus, or when SFCI or sidelink data with a higher emergency degree exists on the SL, the second terminal apparatus may receive the SFCI and the sidelink data from the first terminal apparatus, to improve resource utilization.

In a possible design, with reference to any one of the seventh aspect or the possible designs of the seventh aspect, the priority of the sidelink is the priority of the first sidelink data, the priority of the sidelink is the priority of the SFCI, the priority of the sidelink is a higher priority in the priority of the first sidelink data and the priority of the SFCI, or the priority of the sidelink is a lower priority in the priority of the first sidelink data and the priority of the SFCI.

Based on the possible design, the priority of the first sidelink data or the priority of the SFCI may be used as the priority of the sidelink, that is, whether to send the sidelink data and the SFCI on the SL is determined based on the priority of the first sidelink data or the priority of the SFCI. Alternatively, the higher priority in the priority of the first sidelink data and the priority of the SFCI may be used as the priority of the sidelink, and whether to send the sidelink data and the SFCI on the SL is determined based on data with a higher emergency degree to be sent on the SL. Alternatively, the higher priority in the priority of the first sidelink data and the priority of the SFCI may be used as the priority of the sidelink, and whether to send the sidelink data and the SFCI on the SL is determined based on data with a lower emergency degree to be sent on the SL. Design manners are flexible and diversified.

According to an eighth aspect, this application provides a communication apparatus. The communication apparatus may be a second terminal apparatus or a chip or a system-on-a-chip in the second terminal apparatus, or may be a functional module that is in the second terminal apparatus and that is configured to implement the method according to any one of the seventh aspect or the possible designs of the seventh aspect. The communication apparatus may implement functions performed by the second terminal apparatus in the foregoing aspect or the possible designs, and the functions may be implemented by hardware executing corresponding software. The hardware or the software includes one or more modules corresponding to the foregoing functions. For example, the communication apparatus may include a sending unit.

The sending unit is configured to send, to a first terminal apparatus, second sidelink data and sidelink control information used to indicate a priority of the second sidelink data, where the priority of the second sidelink data is used to determine a priority of sidelink feedback control information SFCI, and the SFCI includes information used to indicate whether the first terminal apparatus has correctly received the second sidelink data.

Based on the possible design, when sidelink data is sent to the first terminal apparatus, a priority of the sidelink data may be sent to the first terminal apparatus, so that the first terminal apparatus determines, based on the received priority of the sidelink data, a priority that is of SFCI and that corresponds to the priority of the sidelink data, and further determines, based on the priority of the SFCI, an emergency degree of data to be transmitted on an SL, to ensure that data with a higher emergency degree on the SL is preferentially sent to a peer end. This improves communication efficiency.

In a possible design, with reference to the seventh aspect, the communication apparatus further includes a receiving unit. The receiving unit is configured to receive the SFCI from the first terminal apparatus through a physical sidelink feedback channel PSFCH, and/or receive first sidelink data from the first terminal apparatus through a physical sidelink shared channel PSSCH, where the PSSCH and the PSFCH occupy a same slot. Based on the possible design, sidelink data and SFCI corresponding to other sidelink data may be received in the same slot, to improve resource utilization.

In a possible design, with reference to the seventh aspect or the possible design of the seventh aspect, the receiving unit is specifically configured to when a priority of the first sidelink data is not lower than a second threshold, and the priority of the SFCI is lower than the second threshold, receive, by the second terminal apparatus, the SFCI from the first terminal apparatus through the PSFCH, when a priority of the first sidelink data is lower than a second threshold, and the priority of the SFCI is higher than the second threshold, receive, by the second terminal apparatus, the first sidelink data from the first terminal apparatus through the PSSCH, when a priority of the first sidelink data is lower than a second threshold, and the priority of the SFCI is lower than the second threshold, receive, by the second terminal apparatus, the SFCI from the first terminal apparatus through the PSFCH, and receive the first sidelink data from the first terminal apparatus through the PSSCH, or when a priority of a sidelink is lower than a second threshold, receive, by the second terminal apparatus, the SFCI from the first terminal apparatus through the PSFCH, and receive the first sidelink data from the first terminal apparatus through the PSSCH, where the priority of the sidelink is determined based on a priority of the first sidelink data and the priority of the SFCI.

Based on the possible design, data with a higher emergency degree from the first terminal apparatus may be transmitted on the SL, or when SFCI or sidelink data with a higher emergency degree exists on the SL, the SFCI and the sidelink data from the first terminal apparatus may be transmitted, to improve resource utilization.

In a possible design, with reference to any one of the seventh aspect or the possible designs of the seventh aspect, the priority of the sidelink is the priority of the first sidelink data, the priority of the sidelink is the priority of the SFCI, the priority of the sidelink is a higher priority in the priority of the first sidelink data and the priority of the SFCI, or the priority of the sidelink is a lower priority in the priority of the first sidelink data and the priority of the SFCI.

Based on the possible design, the priority of the first sidelink data or the priority of the SFCI may be used as the priority of the sidelink, that is, whether to send the sidelink data and the SFCI on the SL is determined based on the priority of the first sidelink data or the priority of the SFCI. Alternatively, the higher priority in the priority of the first sidelink data and the priority of the SFCI may be used as the priority of the sidelink, and whether to send the sidelink data and the SFCI on the SL is determined based on data with a higher emergency degree to be sent on the SL. Alternatively, the higher priority in the priority of the first sidelink data and the priority of the SFCI may be used as the priority of the sidelink, and whether to send the sidelink data and the SFCI on the SL is determined based on data with a lower emergency degree to be sent on the SL. Design manners are flexible and diversified.

According to a ninth aspect, a communication apparatus is provided. The communication apparatus may be a second terminal apparatus or a chip or a system-on-a-chip in the second terminal apparatus. The terminal apparatus may implement functions performed by the second terminal apparatus in the foregoing aspect or the possible designs, and the functions may be implemented by hardware. For example, in a possible design, the terminal apparatus may include a processor and a transceiver. The processor is configured to trigger a sending unit to send, to a first terminal apparatus, second sidelink data and sidelink control information used to indicate a priority of the second sidelink data, where the priority of the second sidelink data is used to determine a priority of sidelink feedback control information SFCI, and the SFCI includes information used to indicate whether the first terminal apparatus has correctly received the second sidelink data. In another possible design, the terminal apparatus may further include a memory, where the memory is configured to store computer-executable instructions and data that are necessary for the terminal apparatus. When the terminal apparatus runs, the processor executes the computer-executable instructions stored in the memory, to enable the terminal apparatus to perform the data transmission method according to any one of the seventh aspect or the possible designs of the seventh aspect.

According to a tenth aspect, a computer-readable storage medium is provided. The computer-readable storage medium may be a readable non-volatile storage medium. The computer-readable storage medium stores computer instructions. When the computer instructions are run on a computer, the computer is enabled to perform the data transmission method according to any one of the seventh aspect or the possible designs of the foregoing aspect.

According to an eleventh aspect, a computer program product including instructions is provided. When the computer program product runs on a computer, the computer is enabled to perform the data transmission method according to any one of the seventh aspect or the possible designs of the foregoing aspect.

According to a twelfth aspect, a communication apparatus is provided. The communication apparatus may be a second terminal apparatus or a chip or a system-on-a-chip in the second terminal apparatus, and the terminal apparatus includes one or more processors and one or more memories. The one or more memories are coupled to the one or more processors, and are configured to store computer program code, and the computer program code includes computer instructions. When the one or more processors execute the computer instructions, the terminal apparatus is enabled to perform the data transmission method according to any one of the seventh aspect or the possible designs of the seventh aspect.

For technical effects achieved by any one of the design manners of the ninth aspect to the twelfth aspect, refer to the technical effects achieved by any one of the seventh aspect or the possible designs of the seventh aspect. Details are not described again.

According to a thirteenth aspect, an embodiment of this application provides a data sending system. The system includes a network device, the first terminal apparatus according to any one of the second aspect to the sixth aspect, and the second terminal apparatus according to any one of the eighth aspect to the twelfth aspect.

DETAILED DESCRIPTION OF ILLUSTRATIVE EMBODIMENTS

The following describes implementations of embodiments of this application in detail with reference to accompanying drawings in this specification.

A data transmission method provided in embodiments of this application may be applied to any communication system supporting sidelink communication and air-interface communication. The communication system may be a 3rd generation partnership project (3rd generation partnership project, 3GPP) communication system, for example, a long term evolution (LTE) system, may be a 5th generation (5G) mobile communication system, a new radio (NR) system, an NR V2X system, or another next-generation communication system, or may be a non-3GPP communication system. This is not limited. The following uses FIG. 1 as an example to describe the data transmission method provided in embodiments of this application.

Figure 1:
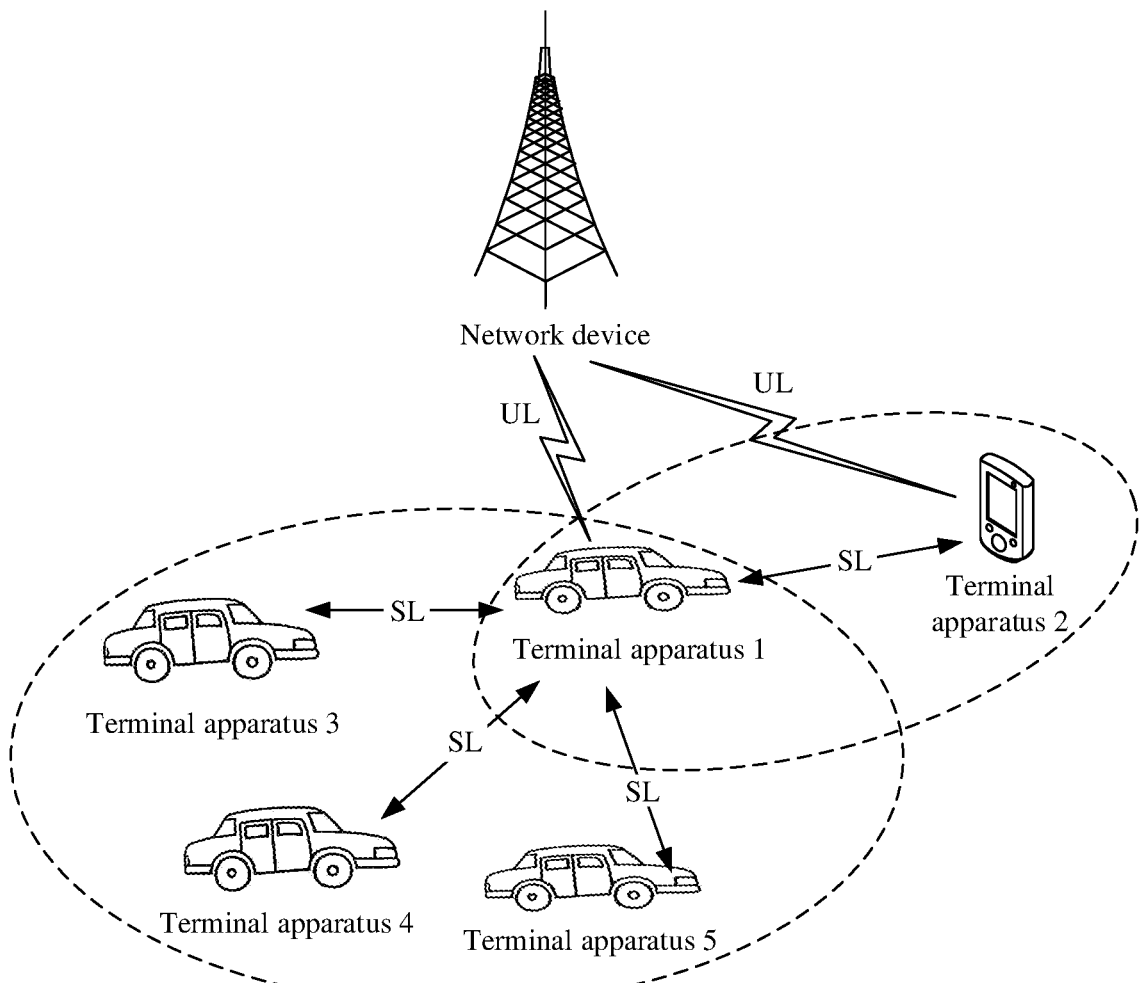
FIG. 1 is a simplified schematic diagram of a communication system according to an embodiment of this application.

FIG. 1 is a schematic diagram of a communication system according to an embodiment of this application. As shown in FIG. 1, the communication system may include a plurality of terminal apparatuses and a network device. The terminal apparatuses may be located within or outside cell coverage of the network device. The terminal apparatus may perform air-interface communication with the network device through a UL, to send service data to the network device on the UL, for example, send uplink data to the network device through a physical sidelink shared channel (PUSCH) on the UL. The terminal apparatus may also perform sidelink communication with another terminal apparatus through an SL, to send service data to the another terminal apparatus on the SL, for example, send sidelink data to the another terminal apparatus through a PSSCH on the SL, or send SFCI to the another terminal apparatus through a PSFCH on the SL. In embodiments of this application, the sidelink communication may include vehicle-to-vehicle (V2V) communication, vehicle-to-pedestrian (V2P) communication, vehicle-to-infrastructure (V2I) communication, and the like. This is not limited.

It should be noted that, in embodiments of this application, sending the uplink data to the network device through the PUSCH on the UL may alternatively be described as sending the PUSCH to the network device through the UL, where the PUSCH carries or includes the uplink data. Similarly, sending the sidelink data to the another terminal apparatus through the PSSCH on the SL may alternatively be described as sending the PSSCH to the another terminal apparatus through the SL, where the PSSCH carries or includes the sidelink data, sending the SFCI to the another terminal apparatus through the PSFCH on the SL may alternatively be described as sending the PSFCH to the another terminal apparatus through the SL, where the PSFCH carries or includes the SFCI. This is not limited.

The network device in FIG. 1 may be any device having a wireless transceiver function, and is mainly configured to implement functions such as a radio physical control function, resource scheduling and radio resource management, radio access control, and mobility management. Specifically, the network device may be an access network (AN) device/a radio access network (RAN) device, may be a device including a plurality of 5G-AN/5G-RAN nodes, or may be a NodeB (nodeB, NB), an evolved NodeB (eNB), a next generation NodeB (gNB), a transmission reception point (TRP), a transmission point (TP), a road side unit (RSU), any other access node, or the like. This is not limited.

The terminal apparatus in FIG. 1 may be referred to as a terminal, user equipment (UE), a mobile station (MS), a mobile terminal (MT), or the like. Specifically, the terminal apparatus in FIG. 1 may be a mobile phone, a tablet computer, or a computer having a wireless transceiver function. Alternatively, the terminal may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a wireless terminal in a smart home, a vehicle-mounted terminal, a vehicle having a vehicle-to-vehicle (V2V) communication capability, an intelligent connected vehicle, or the like. This is not limited. The terminal apparatus and the network device in embodiments of this application each may be one or more chips, or may be a system-on-a-chip (SOC) or the like.

It should be noted that FIG. 1 is merely a figure used as an example, and a quantity of devices included in FIG. 1 is not limited. In addition, the communication system may further include another device in addition to the devices shown in FIG. 1. Names of the devices and links in FIG. 1 are not limited. The devices and links may alternatively have other names in addition to the names shown in FIG. 1. For example, the UL may alternatively be named a Uu link, and the SL may alternatively be named a PC5 link or a direct link. This is not limited.

Figure 2:
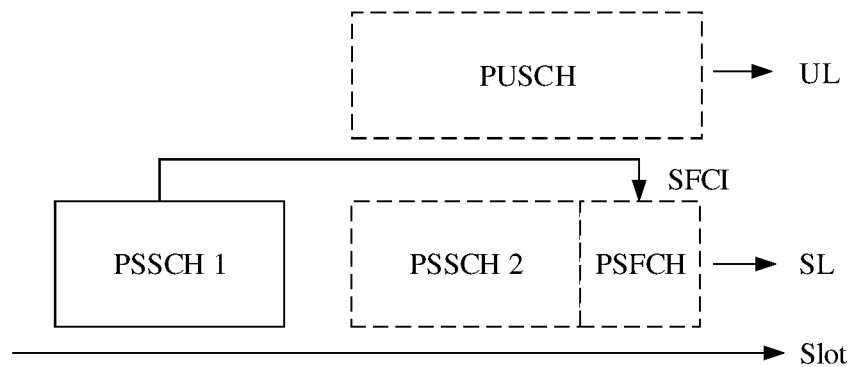
FIG. 2 is a schematic diagram of a scenario in which channels on a plurality of links are simultaneously transmitted.

In the communication system shown in FIG. 1, channels on a UL and an SL may be simultaneously transmitted in a same slot. As shown in FIG. 2, in a same slot, a terminal apparatus may need to send a PUSCH to a network device, and need to send sidelink data through a PSSCH 2 and send SFCI corresponding to a PSSCH 1 through a PSFCH.

Figure 3A:
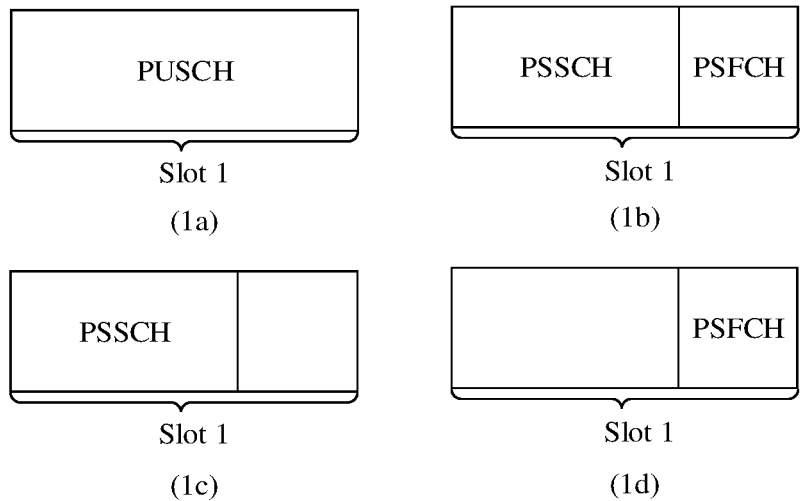
FIG. 3a is a schematic diagram of a frame format according to an embodiment of this application.

When the channels on the UL and the SL are simultaneously transmitted in the same slot, to comply with a principle of sending data on one of the UL and the SL in the same slot, the terminal apparatus may send data in any one of four frame formats shown in FIG. 3a. As shown in FIG. 3a, a PUSCH is sent in a slot 1, a PSSCH and a PSFCH are sent in a slot 1, a PSSCH is sent in a slot 1, or a PSFCH is sent in a slot 1. Specifically, which frame format is to be used by the terminal apparatus to send the data becomes a problem that needs to be discussed. To resolve this problem, embodiments of this application provide a data transmission method, to determine, based on a priority of data carried on each channel, a specific channel to send data. Specifically, for this process, refer to description in an embodiment corresponding to FIG. 5 or FIG. 7.

It should be noted that data described in embodiments of this application may alternatively be described as service data. Based on a type of a link for transmitting the service data, data transmitted on the SL may be referred to as SL service data or sidelink data, and data transmitted from the terminal apparatus to the network device on the UL may be referred to as UL service data, uplink data, or the like.

In embodiments of this application, the service data transmitted on the UL may be classified into UL emergency service data and UL non-emergency service data based on an emergency degree of the service data transmitted on the UL, and the service data transmitted on the SL may be classified into SL emergency service data and SL non-emergency service data based on an emergency degree of the service data transmitted on the SL. The four types of service data, namely, the UL emergency service data, the SL emergency service data, the UL non-emergency service data, and the SL non-emergency service data have different emergency degrees. For example, the emergency degrees of the four types of service data may have the following sorting rule: UL emergency service data>SL emergency service data>UL non-emergency service data>SL non-emergency service data. The sorting rule may be followed in embodiments of this application. The UL emergency service data is preferentially sent in a slot. When there is no UL emergency service data, it is further considered to send the SL emergency service data, the UL non-emergency service data, the SL emergency service data, or the like. This ensures that service data with a higher emergency degree is sent to a peer end in time.

The UL emergency service data may be service data that is transmitted on the UL and that has a high emergency degree, for example, a low latency and high reliability. For example, the UL emergency service data may include network-side security data or ultra-reliable low-latency communication (URLLC) data.

The UL non-emergency service data may be service data that is transmitted on the UL and that has a low emergency degree, for example, a high latency and low reliability. For example, the UL non-emergency service data may include network-side video data, network-side voice data, or enhanced mobile broadband (eMBB) data.

The SL emergency service data may be service data that is transmitted on the SL and that has a high emergency degree, for example, a low latency and high reliability. For example, the SL emergency service data may include security data (for example, vehicle alarm information) or URLLC data used in a V2X communication process.

The SL non-emergency service data may be service data that is transmitted on the SL and that has a low emergency degree, for example, a high latency and low reliability. The SL non-emergency service data may include video data, voice data, eMBB data, or the like in the V2X communication process.

To distinguish the emergency degrees of the service data, in embodiments of this application, a priority may be configured for the service data based on the emergency degree of the service data, and the priority of the service data is used to indicate the emergency degree of the service data. The priority of the service data may be a value or another identifier used to indicate the emergency degree of the service data. This is not limited. Embodiments of this application are described only by using an example in which the priority of the service data is a value.

For example, the priority of the service data may be configured according to the following rule, where a lower emergency degree of the service data indicates a higher priority of the service data, and a higher emergency degree of the service data indicates a lower priority of the service data. For example, a priority of the UL emergency service data is lower than a priority of the UL non-emergency service data. For service data 1 and service data 2 that are both UL emergency service data, if an emergency degree of the service data 1 is higher than an emergency degree of the service data 2, a priority of the service data 1 is lower than a priority of the service data 2. Alternatively, the priority of the service data may be configured according to the following rule: A lower emergency degree of the service data indicates a lower priority of the service data, and a higher emergency degree of the service data indicates a higher priority of the service data. Details are not described. Embodiments of this application are described only by using an example in which a lower emergency degree of the service data indicates a higher priority of the service data, and a higher emergency degree of the service data indicates a lower priority of the service data.

Figure 3B:
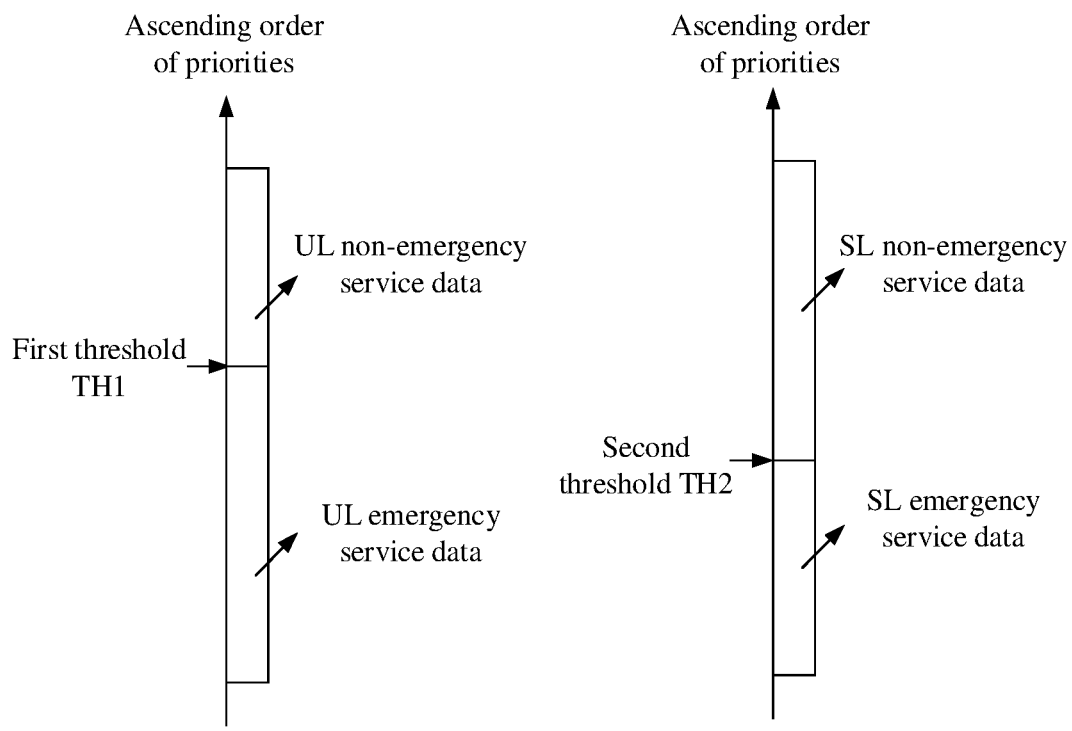
FIG. 3b is a diagram of a relationship between service data and a service priority according to an embodiment of this application.

For example, as shown in FIG. 3b, a first threshold TH1 is used as a demarcation line, so that service data whose priority is lower than the first threshold is UL emergency service data, and service data whose priority is not lower than the first threshold TH1 is UL non-emergency service data. A second threshold TH2 is used as a demarcation line, so that service data whose priority is lower than the second threshold TH2 is SL emergency service data, and service data whose priority is not lower than the second threshold is SL non-emergency service data.

It should be noted that a value relationship between the first threshold TH1 and the second threshold TH2 is not limited in embodiments of this application. The first threshold may be greater than the second threshold, may be less than the second threshold, or may be equal to the second threshold. This is not limited.

Figure 4:
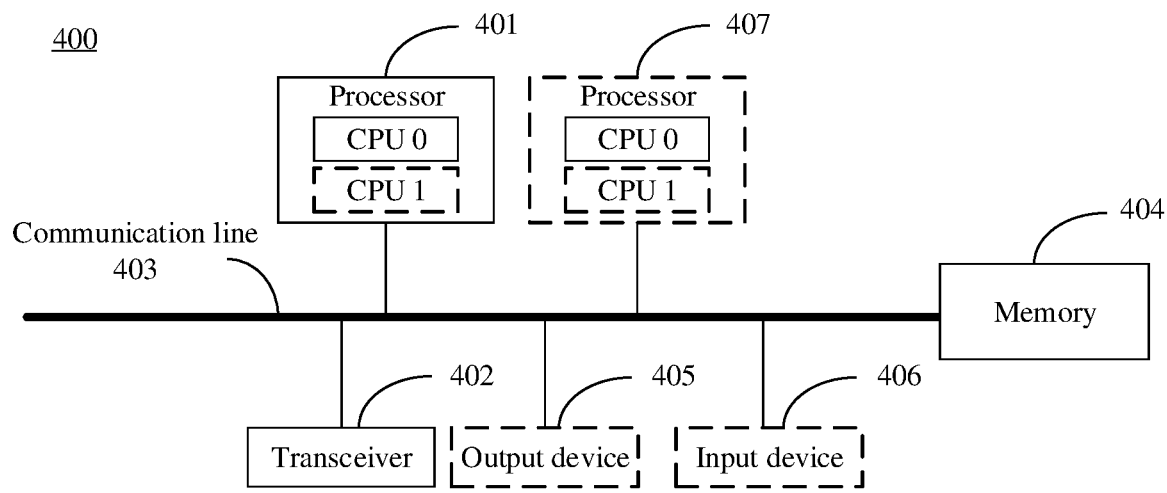
FIG. 4 is a schematic composition diagram of a terminal apparatus according to an embodiment of this application.

During specific implementation, each device shown in FIG. 1 may be in a composition structure shown in FIG. 4 or include components shown in FIG. 4. FIG. 4 is a schematic composition diagram of a communication apparatus 400 according to an embodiment of this application. The communication apparatus 400 may be a terminal apparatus or a chip or a system-on-a-chip in the terminal apparatus. As shown in FIG. 4, the communication apparatus 400 includes a processor 401, a transceiver 402, and a communication line 403.

Further, the communication apparatus 400 may include a memory 404. The processor 401, the memory 404, and the transceiver 402 may be connected through the communication line 403.

The processor 401 is a central processing unit (CPU), a general purpose processor, a network processor (NP), a digital signal processor (DSP), a microprocessor, a microcontroller, a programmable logic device (PLD), or any combination thereof. The processor 401 may alternatively be another apparatus having a processing function, for example, a circuit, a component, or a software module. This is not limited.

The transceiver 402 is configured to communicate with another device or another communication network. The another communication network may be the Ethernet, a radio access network (RAN), a wireless local area network (WLAN), or the like. The transceiver 402 may be a module, a circuit, a transceiver, or any apparatus that can implement communication.

The communication line 403 is configured to transmit information between the components included in the communication apparatus 400.

The memory 404 is configured to store instructions. The instructions may be a computer program.

The memory 404 may be a read-only memory (ROM) or another type of static storage device that can store static information and/or instructions, may be a random access memory (RAM) or another type of dynamic storage device that can store information and/or instructions, or may be an electrically erasable programmable read-only memory (EEPROM), a compact disc read-only memory (CD-ROM) or another compact disc storage, an optical disc storage (including a compressed optical disc, a laser disc, an optical disc, a digital universal optical disc, a Blu-ray optical disc, or the like), a magnetic disk storage medium or another magnetic storage device, or the like. This is not limited.

It should be noted that the memory 404 may be independent of the processor 401, or may be integrated into the processor 401. The memory 404 may be configured to store instructions, program code, some data, or the like. The memory 404 may be located inside the communication apparatus 400, or may be located outside the communication apparatus 400. This is not limited. The processor 401 is configured to execute the instructions stored in the memory 404, to implement the data transmission method provided in the following embodiments of this application.

In an example, the processor 401 may include one or more CPUs, for example, a CPU 0 and a CPU 1 in FIG. 4.

In an optional implementation, the communication apparatus 400 includes a plurality of processors. For example, the communication apparatus 400 may further include a processor 407 in addition to the processor 401 in FIG. 4.

In an optional implementation, the communication apparatus 400 further includes an output device 405 and an input device 406. For example, the input device 406 is a keyboard, a mouse, a microphone, a joystick, or another device, and the output device 405 is a display, a speaker, or another device.

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the terminal apparatus. The terminal apparatus may include more or fewer components than the components shown in FIG. 4, combine some components, or have a different component arrangement.

In embodiments of this application, the chip system may include a chip, or may include a chip and another discrete component.

In addition, mutual reference may be made to actions, terms, and the like in embodiments of this application. This is not limited. In embodiments of this application, names of messages exchanged between devices, names of parameters in the messages, or the like are merely examples. Other names may alternatively be used during specific implementation. This is not limited.

The following uses the communication system shown in FIG. 1 as an example to describe the data transmission method provided in embodiments of this application. A terminal apparatus in the following embodiments may have the components shown in FIG. 4.

Figure 5:
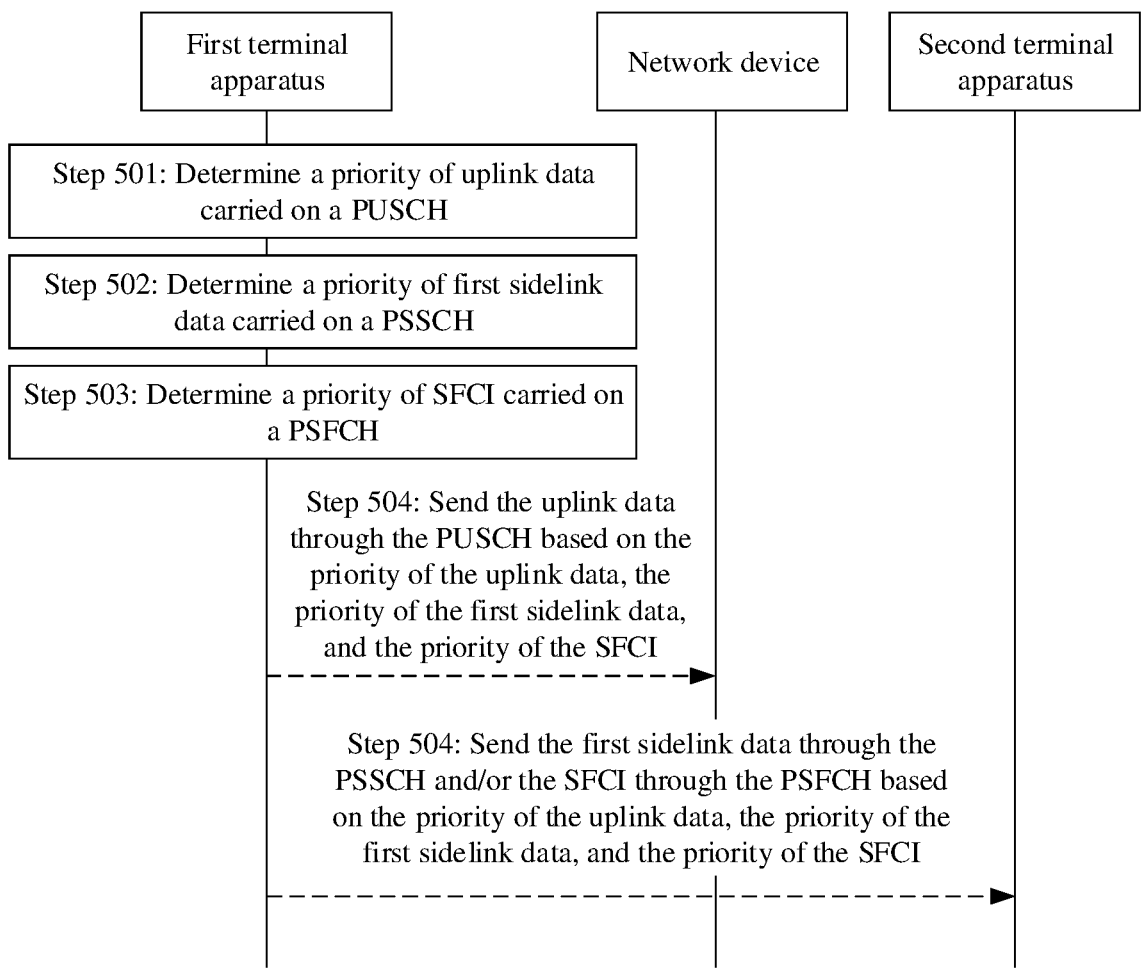
FIG. 5 is a flowchart of a data transmission method according to an embodiment of this application.

FIG. 5 shows a data transmission method according to an embodiment of this application. When a first terminal apparatus determines that a PUSCH on a UL and a PSSCH and a PSFCH on an SL occupy a same slot to send data, the method may be used to help the first terminal apparatus to select the UL or the SL to send data. As shown in FIG. 5, the method may include the following steps.

Step 501: The first terminal apparatus determines a priority of uplink data carried on the PUSCH.

The first terminal apparatus may be any terminal apparatus in the system shown in FIG. 1. For example, the first terminal apparatus may be a terminal apparatus 1 in the system shown in FIG. 1.

The uplink data carried on the PUSCH may be generated at an application layer of the first terminal apparatus, and may be classified based on an emergency degree of the uplink data into two types, namely, UL emergency service data and UL non-emergency service data. Related description of the UL emergency service data or the UL non-emergency service data is as described above, and details are not described again.

In an example, the first terminal apparatus may determine, based on a correspondence between UL service data and a priority of the uplink data carried on the PUSCH. The correspondence between UL service data and a priority is preconfigured in the first terminal apparatus, and may be in a table form or an array form. This is not limited.

For example, Table 1 is a table of the correspondence between UL service data and a priority. After generating the uplink data, the first terminal apparatus may query Table 1 to determine the priority of the uplink data carried on the PUSCH. For example, when the uplink data carried on the PUSCH is UL service data 1, it is determined by querying Table 1 that the priority of the uplink data carried on the PUSCH is 1. When the uplink data carried on the PUSCH is UL service data 3, it is determined by querying Table 1 that the priority of the uplink data carried on the PUSCH is 6.

TABLE 1

| UL service data | Priority |
|---|---|
| UL service data 1 | 1 |
| UL service data 2 | 2 |
| UL service data 3 | 6 |

In another example, the first terminal apparatus may receive scheduling information from a network device. The scheduling information may be included in or carried on a physical downlink control channel (PDCCH), and may be used to schedule the uplink data. The scheduling information may include the priority of the uplink data, and may further include time domain resource information, frequency domain resource information, and/or the like of the PUSCH used to carry the uplink data. After receiving the scheduling information, the first terminal apparatus may obtain the priority of the uplink data from the received scheduling information.

Step 502: The first terminal apparatus determines a priority of first sidelink data carried on a PSSCH.

The first sidelink data carried on the PSSCH is any sidelink data sent by the first terminal apparatus to another terminal apparatus through the SL. The another terminal apparatus may be a second terminal apparatus, a third terminal apparatus, or the like. This is not limited. For example, assuming that the first terminal apparatus is the terminal apparatus 1 in FIG. 1, the first sidelink data may be sidelink data sent by the terminal apparatus 1 to a terminal apparatus 2, or may be sidelink data sent by the terminal apparatus 1 to a terminal apparatus 3. This is not limited. This embodiment of this application is described only by using an example in which the first terminal apparatus sends the first sidelink data to the second terminal apparatus.

The first sidelink data may be generated at the application layer of the first terminal apparatus, and may include SL emergency service data or SL non-emergency service data. Related description of the SL emergency service data or the SL non-emergency service data is as described above, and details are not described again.

For example, the first terminal apparatus may determine, based on a correspondence between SL service data and a priority, the priority of the first sidelink data carried on the PSSCH. The correspondence between SL service data and a priority is preconfigured in the first terminal apparatus, and may be in a table form or an array form. This is not limited.

For example, Table 2 is a table of the correspondence between SL service data and a priority. After generating the first sidelink data, the first terminal apparatus may query Table 2 to determine the priority of the first sidelink data. For example, when the first sidelink data is SL service data 1, it is determined by querying Table 2 that the priority of the first sidelink data is 5. When the first sidelink data is SL service data 3, it is determined by querying Table 2 that the priority of the first sidelink data is 9.

TABLE 2

| SL service data | Priority |
|---|---|
| SL service data 1 | 5 |
| SL service data 2 | 7 |
| SL service data 3 | 9 |

It should be noted that, in this embodiment of this application, the table of the correspondence between UL service data and a priority and the table of the correspondence between SL service data and a priority are merely examples for description. The table of the correspondence between UL service data and a priority may be the same as or different from the table of the correspondence between SL service data and a priority. This is not limited.

Step 503: The first terminal apparatus determines a priority of SFCI carried on a PSFCH.

The SFCI carried on the PSFCH may correspond to second sidelink data, and the second sidelink data may be sidelink data received by the first terminal from the second terminal apparatus. The second terminal apparatus may be any terminal apparatus that performs sidelink communication with the first terminal apparatus through the SL. The second sidelink data may be the SL emergency service data or the SL non-emergency service data as described above. For example, the first terminal apparatus may be the terminal apparatus 1, the second terminal apparatus may be the terminal apparatus 2 in FIG. 1, and the second sidelink data may be SL emergency service data sent by the terminal apparatus 2 to the terminal apparatus 1.

The SFCI may include at least an acknowledgment (ACK) message/negative acknowledgment (NACK) message used to indicate whether the first terminal apparatus has successfully received the second sidelink data, and may further include resource channel state information (CSI), receive-end measured assistance information (receiver UE measured assistance information, RMAI), and/or the like. For example, as shown in FIG. 2, the second sidelink data is carried on a PSSCH 1 to be sent to the first terminal apparatus. After receiving the second sidelink data, the first terminal apparatus may send the SFCI corresponding to the second sidelink data to the second terminal apparatus through the PSFCH.

For example, the first terminal apparatus may determine a priority of the second sidelink data, and determine the priority of the SFCI based on the priority of the second sidelink data. For example, the priority of the SFCI is set to be the same as the priority of the second sidelink data.

In a possible design, the first terminal apparatus receives the priority of the second sidelink data from the second terminal apparatus. The priority of the second sidelink data may be determined by the second terminal apparatus, and may be sent together with the second sidelink data to the first terminal apparatus via sidelink control information associated with the second sidelink data. The sidelink control information may be carried on a physical sidelink control channel (PSCCH).

In another possible design, the first terminal apparatus receives the second sidelink data from the second terminal apparatus, and may determine the priority of the second sidelink data based on the correspondence between UL service data and a priority (refer to step 502), and determine the priority of the SFCI based on the priority of the second sidelink data.

It should be noted that a sequence of performing step 501 to step 503 is not limited in this embodiment of this application. Step 501 to step 503 may be performed in the sequence shown in FIG. 5, may be performed simultaneously, or may be performed in a sequence of step 502, step 503, and step 501, in a sequence of step 501, step 503, and step 502, or in another sequence. This is not limited.

Step 504: The first terminal apparatus sends the uplink data through the PUSCH, or the first sidelink data through the PSSCH and/or the SFCI through the PSFCH based on the priority of the uplink data, the priority of the first sidelink data, and the priority of the SFCI.

Further optionally, the network device receives, through the PUSCH, the uplink data sent by the first terminal apparatus. Alternatively, the second terminal apparatus receives the first sidelink data through the PSSCH, and/or receives the SFCI through the PSFCH.

For example, to ensure that network-side emergency service data can be preferentially sent to the network device, when the UL emergency service data exists, the first terminal apparatus may preferentially send the UL emergency service data. When the UL emergency service data does not exist, the first terminal apparatus may consider sending the SL emergency service, the SL non-emergency service data, or the UL non-emergency service data, that is, the first terminal apparatus may send data to the network device or the another terminal apparatus according to the following sorting rule: UL emergency service data>SL emergency service>UL non-emergency service data>SL non-emergency service data. Specifically, the process is as follows.

The first terminal apparatus compares the priority of the uplink data with a first threshold.

When the priority of the uplink data is lower than the first threshold, it indicates that the uplink data is the UL emergency service data, and the uplink data is sent to the network device through the PUSCH.

Alternatively, when the priority of the uplink data is not lower than the first threshold, it indicates that the uplink data is the UL non-emergency service data, and the first sidelink data may be sent through the PSSCH and/or the SFCI may be sent through the PSFCH, based on the priority of the first sidelink data and the priority of the SFCI.

In a possible design, that the first terminal apparatus sends the first sidelink data through the PSSCH and the SFCI through the PSFCH based on the priority of the first sidelink data and the priority of the SFCI may include the following.

The first terminal apparatus determines a priority of the sidelink based on the priority of the first sidelink data and the priority of the SFCI, and compares the priority of the sidelink with a second threshold.

When the priority of the sidelink is lower than the second threshold, it indicates that the SL emergency service data needs to be sent on the SL, the first sidelink data is sent through the PSSCH, and the SFCI is sent through the PSFCH.

Alternatively, when the priority of the sidelink is not lower than the second threshold, it indicates that the SL non-emergency service data exists on the SL, and according to a priority rule that UL non-emergency service data>SL non-emergency service data, it is considered to send the UL non-emergency service data, that is, send the uplink data to the network device through the PUSCH.

The priority of the sidelink may be the priority of the first sidelink data. Alternatively, the priority of the sidelink may be the priority of the SFCI. Alternatively, the priority of the sidelink may be a higher priority in the priority of the first sidelink data and the priority of the SFCI, for example, Priority of the sidelink=max(Priority of the first sidelink data, Priority of the SFCI). Alternatively, the priority of the sidelink may be a lower priority in the priority of the first sidelink data and the priority of the SFCI, in other words, Priority of the sidelink=min(Priority of the first sidelink data, Priority of the SFCI). It should be noted that the foregoing merely lists several manners of determining the priority of the sidelink. In addition, the priority of the sidelink may alternatively be obtained through calculation on a combination of the priority of the first sidelink data and the priority of the SFCI. For example, weighting calculation, average calculation, or the like is performed on the priority of the first sidelink data and the priority of the SFCI to obtain the priority of the sidelink. This is not limited.

It should be noted that the sidelink is merely a name used as an example, and may alternatively have another name. This is not limited.

In another possible design, when the priority of the uplink data is not lower than the first threshold, sending the first sidelink data to the second or third terminal apparatus through the PSSCH and/or sending the SFCI to the second terminal apparatus through the PSFCH includes the following.

When the priority of the first sidelink data is lower than a second threshold, and the priority of the SFCI is not lower than the second threshold, it indicates that the first sidelink data is the SL emergency service data, and the first terminal apparatus sends the first sidelink data through the PSSCH.

Alternatively, when the priority of the first sidelink data is not lower than a second threshold, and the priority of the SFCI is lower than the second threshold, it indicates that the second sidelink data corresponding to the SFCI is the SL emergency service data and the SFCI corresponding to the second sidelink data is also the SL emergency service data, and the first terminal apparatus sends the SFCI through the PSFCH.

Alternatively, when the priority of the first sidelink data is lower than a second threshold, and the priority of the SFCI is lower than the second threshold, it indicates that the first sidelink data is the SL emergency service data and the SFCI corresponding to the second sidelink data is the SL emergency service data, and the first terminal apparatus sends the first sidelink data through the PSSCH, and sends the SFCI through the PSFCH.

Alternatively, when the priority of the first sidelink data is not lower than a second threshold, and the priority of the SFCI is not lower than the second threshold, it indicates that the first sidelink data is the SL non-emergency service data and the SFCI corresponding to the second sidelink data is the SL non-emergency service data, and the first terminal apparatus sends the uplink data through the PUSCH according to the foregoing priority rule that UL non-emergency service data>SL non-emergency service data.

It can be learned from the foregoing that in a scenario in which the PUSCH, the PSSCH, and the PSFCH are simultaneously transmitted, there are the following five data transmission modes (1) to (5).

Mode (1): The priority of the sidelink is equal to the priority of the first sidelink data carried on the PSSCH.

When the priority of the uplink data is lower than the first threshold, the first terminal apparatus sends the uplink data through the PUSCH. Alternatively, when the priority of the uplink data is not lower than the first threshold, and the priority of the sidelink is lower than the second threshold, the first terminal apparatus sends the first sidelink data through the PSSCH, and sends the SFCI through the PSFCH. Alternatively, when the priority of the uplink data is not lower than the first threshold, and the priority of the sidelink is not lower than the second threshold, the first terminal apparatus sends the uplink data to the network device through the PUSCH.

In this way, based on the data transmission mode (1), the uplink data may be preferentially sent, and the first sidelink data and the SFCI are sent through the SL when the priority of the uplink data is not lower than the first threshold. This improves resource utilization, and ensures that the priority of the SFCI does not affect the priority of the first sidelink data.

Mode (2): The priority of the sidelink is equal to the priority of the SFCI carried on the PSFCH.

When the priority of the uplink data is lower than the first threshold, the first terminal apparatus sends the uplink data through the PUSCH. Alternatively, when the priority of the uplink data is not lower than the first threshold, and the priority of the sidelink is lower than the second threshold, the first terminal apparatus sends the first sidelink data through the PSSCH, and sends the SFCI through the PSFCH. Alternatively, when the priority of the uplink data is not lower than the first threshold, and the priority of the sidelink is not lower than the second threshold, the first terminal apparatus sends the uplink data through the PUSCH.

In this way, based on the data transmission mode (2), the uplink data may be preferentially sent, and the first sidelink data and the SFCI are sent through the SL when the priority of the uplink data is not lower than the first threshold. This improves resource utilization, and ensures that the priority of the first sidelink data does not affect the priority of the SFCI.

Mode (3): The priority of the sidelink is equal to max(the priority of the first sidelink data carried on the PSSCH, the priority of the SFCI carried on the PSFCH).

When the priority of the uplink data is lower than the first threshold, the first terminal apparatus sends the uplink data through the PUSCH. Alternatively, when the priority of the uplink data is not lower than the first threshold, and the priority of the sidelink is lower than the second threshold, the first terminal apparatus sends the first sidelink data through the PSSCH, and sends the SFCI through the PSFCH. Alternatively, when the priority of the uplink data is not lower than the first threshold, and the priority of the sidelink is not lower than the second threshold, the first terminal apparatus sends the uplink data through the PUSCH.

In this way, based on the data transmission mode (3), the uplink data may be preferentially sent, and the first sidelink data and the SFCI are sent through the SL when the priority of the uplink data is not lower than the first threshold. This improves resource utilization, and ensures that the SL non-emergency service data or feedback information does not affect the priority of the UL non-emergency service data.

Mode (4): The priority of the sidelink is equal to min(the priority of the first sidelink data carried on the PSSCH, the priority of the SFCI carried on the PSFCH).

When the priority of the uplink data is lower than the first threshold, the first terminal apparatus sends the uplink data through the PUSCH. Alternatively, when the priority of the uplink data is not lower than the first threshold, and the priority of the sidelink is lower than the second threshold, the first terminal apparatus sends the first sidelink data through the PSSCH, and sends the SFCI through the PSFCH. Alternatively, when the priority of the uplink data is not lower than the first threshold, and the priority of the sidelink is not lower than the second threshold, the first terminal apparatus sends the uplink data through the PUSCH.

In this way, based on the data transmission mode (4), the uplink data may be preferentially sent, and the first sidelink data and the SFCI are sent through the SL when the priority of the uplink data is not lower than the first threshold. This improves resource utilization, and ensures that the SL emergency service data or feedback information can be sent in time.

Mode (5): When the priority of the uplink data is lower than the first threshold, the first terminal apparatus sends the uplink data through the PUSCH.

Alternatively, when the priority of the uplink data is not lower than the first threshold, the priority of the first sidelink data is lower than the second threshold, and the priority of the SFCI is not lower than the second threshold, the first terminal apparatus sends the first sidelink data through the PSSCH. Alternatively, when the priority of the uplink data is not lower than the first threshold, the priority of the first sidelink data is not lower than the second threshold, and the priority of the SFCI is lower than the second threshold, the first terminal apparatus sends the SFCI through the PSFCH. Alternatively, when the priority of the uplink data is not lower than the first threshold, the priority of the first sidelink data is lower than the second threshold, and the priority of the SFCI is lower than the second threshold, the first terminal apparatus sends the first sidelink data through the PSSCH, and sends the SFCI through the PSFCH.

Alternatively, when the priority of the uplink data is not lower than the first threshold, the priority of the first sidelink data is not lower than the second threshold, and the priority of the SFCI is not lower than the second threshold, the first terminal apparatus sends the uplink data through the PUSCH.

The following describes the five data transmission modes by using an example in which the first terminal apparatus is the terminal apparatus 1, the first threshold is 6, the second threshold is 4, a priority of network-type security data is 3, a priority of voice-type data is 9, a priority of vehicle alarm information is 2, the uplink data is carried on the PUSCH, the first sidelink data is carried on a PSSCH 2, and SFCI corresponding to the PSSCH 1 is carried on the PSFCH.

Figure 6A:
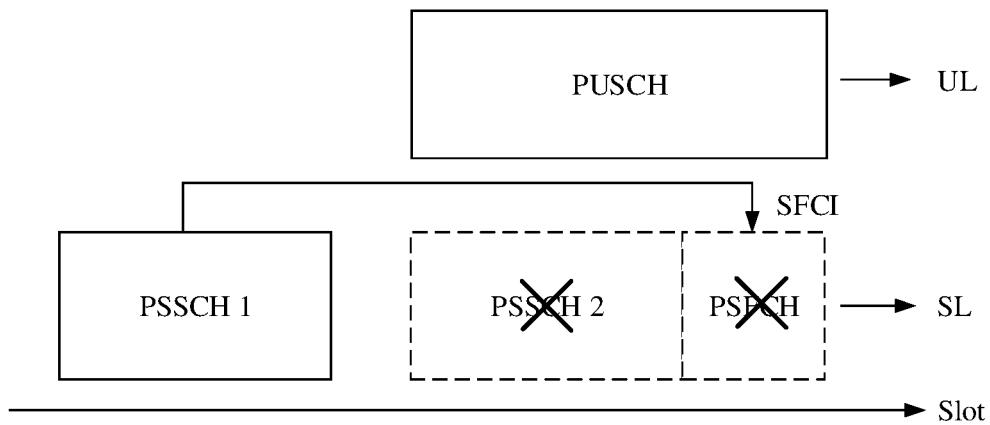
FIG. 6a is a schematic diagram of data transmission according to an embodiment of this application.

For example, as shown in FIG. 6a, it is assumed that the uplink data generated by the terminal apparatus 1 is the network-type security data, the first sidelink data is the voice-type data, and the second sidelink data received by the terminal apparatus 1 is the vehicle alarm information. After determining that the PUSCH carrying the uplink data, the PSSCH carrying the first sidelink data, and the PSFCH carrying the SFCI occupy a same slot 1, the terminal apparatus 1 determines that the priority of the uplink data is 3, the priority of the first sidelink data is 9, and the priority of the SFCI is 2. The terminal apparatus 1 may compare the priority 3 of the uplink data with the first threshold 6 in any one of the foregoing mode (1) to mode (5), to determine that the priority of the uplink data is lower than the first threshold and the uplink data is the UL emergency service data, and send the uplink data to the network device in the slot 1.

Figure 6B:
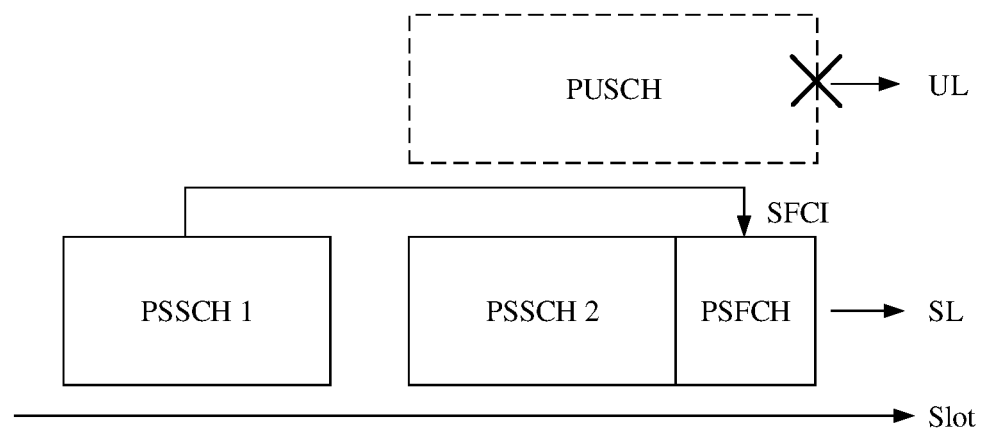
FIG. 6b is a schematic diagram of data transmission according to an embodiment of this application.

For another example, it is assumed that the uplink data generated by the terminal apparatus 1 is the voice-type data, the first sidelink data is the voice-type data, and the second sidelink data received by the terminal apparatus 1 is the vehicle alarm information. After determining that the PUSCH carrying the uplink data, the PSSCH carrying the first sidelink data, and the PSFCH carrying the SFCI occupy a same slot 1, the terminal apparatus 1 determines that the priority of the uplink data is 9, the priority of the first sidelink data is 9, and the priority of the SFCI is 2. Refer to FIG. 6*a*. The terminal apparatus 1 may determine, in the foregoing mode (1), that the priority of the uplink data is 9 and is higher than the first threshold 6, and that the priority of the sidelink is 9 and is also higher than the second threshold 4. In this case, the terminal apparatus 1 determines that no SL emergency service data exists on the UL or the SL, and sends the uplink data to the network device in the slot 1 according to the foregoing sorting rule. As shown in FIG. 6*b*, the terminal apparatus 1 may alternatively determine, in the foregoing mode (2), that the priority of the uplink data is 9 and is higher than the first threshold 6, and that the priority of the sidelink is 2 and is lower than the second threshold 4. The terminal apparatus 1 sends the first sidelink data and the SFCI in the slot 1. Refer to FIG. 6*a*. The terminal apparatus 1 may alternatively determine, in the foregoing mode (3), that the priority of the uplink data is 9 and is higher than the first threshold 6, and that the priority of the sidelink is 9 and is also higher than the second threshold 4. In this case, the terminal apparatus 1 determines that no SL emergency service data exists on the UL or the SL, and sends the uplink data to the network device in the slot 1 according to the foregoing sorting rule. Alternatively, as shown in FIG. 6*b*, it may be determined in the foregoing mode (4) that the priority of the sidelink is 2 and is lower than the second threshold 4. In this case, the terminal apparatus 1 sends the first sidelink data and the SFCI in the slot 1.

Figure 6C:
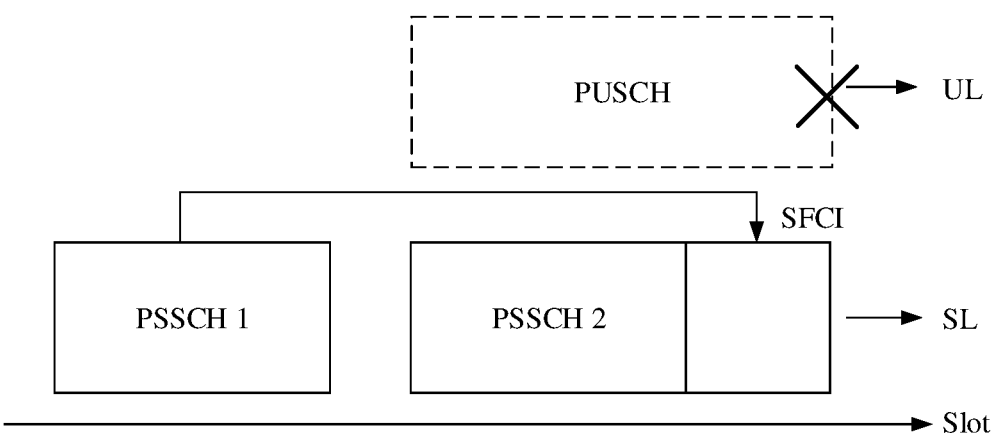
FIG. 6c is a schematic diagram of data transmission according to an embodiment of this application.

For still another example, as shown in FIG. 6*c*, it is assumed that the uplink data generated by the terminal apparatus 1 is the voice-type data, the first sidelink data is the vehicle alarm information, and the second sidelink data received by the terminal apparatus 1 is the voice-type data. After determining that the PUSCH carrying the uplink data, the PSSCH carrying the first sidelink data, and the PSFCH carrying the SFCI occupy a same slot 1, the terminal apparatus 1 determines that the priority of the uplink data is 9, the priority of the first sidelink data is 2, and the priority of the SFCI is 9. The terminal apparatus 1 determines that the priority of the uplink data is higher than the first threshold 6, the priority of the first sidelink data is 2 and is lower than the second threshold 4, and the priority of the SFCI is higher than the second threshold. In this case, the terminal apparatus 1 may send the first sidelink data in the slot 1 in the foregoing mode (5).

Figure 6D:
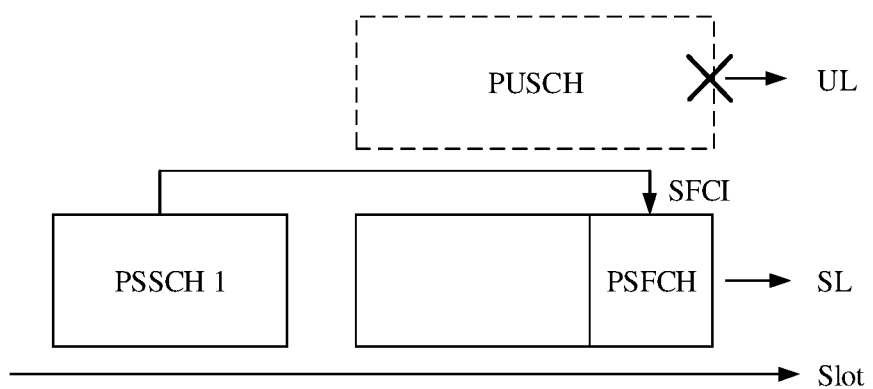
FIG. 6d is a schematic diagram of data transmission according to an embodiment of this application.

For still another example, as shown in FIG. 6*d*, it is assumed that the uplink data generated by the terminal apparatus 1 is the voice-type data, the first sidelink data is the voice-type data, and the second sidelink data received by the terminal apparatus 1 is the vehicle alarm information. After determining that the PUSCH carrying the uplink data, the PSSCH carrying the first sidelink data, and the PSFCH carrying the SFCI occupy a same slot 1, the terminal apparatus 1 determines that the priority of the uplink data is 9, the priority of the first sidelink data is 9, and the priority of the SFCI is 2. The terminal apparatus 1 determines that the priority of the uplink data is higher than the first threshold 6, the priority of the first sidelink data is higher than the second threshold 4, and the priority of the SFCI is lower than the second threshold. In this case, the terminal apparatus 1 may send the SFCI in the slot 1 in the foregoing mode (5).

For still another example, it is assumed that the uplink data generated by the terminal apparatus 1 is the voice-type data, the first sidelink data is the voice-type data, and the second sidelink data received by the terminal apparatus 1 is the voice-type data. After determining that the PUSCH carrying the uplink data, the PSSCH carrying the first sidelink data, and the PSFCH carrying the SFCI occupy a same slot 1, the terminal apparatus 1 determines that the priority of the uplink data is 9, the priority of the first sidelink data is 9, and the priority of the SFCI is 9. The terminal apparatus 1 determines that the priority of the uplink data is higher than the first threshold 6, the priority of the first sidelink data is higher than the second threshold 4, and the priority of the SFCI is higher than the second threshold 4. In this case, the terminal apparatus 1 may send uplink data to the network device in the slot 1 in any one of the foregoing mode (1) to mode (5).

Based on the method shown in FIG. 5, when the PUSCH, the PSSCH, and the PSFCH occupy the same slot, the first terminal apparatus may determine, based on the priority of the uplink data to be transmitted on the UL, the priority of the sidelink data to be transmitted on the SL, and the priority of the SFCI to be transmitted on the SL, to send the uplink data on the UL or send the sidelink data and/or the SFCI on the SL. When the PUSCH, the PSSCH, and the PSFCH are simultaneously transmitted in the same slot, this helps the terminal apparatus to select the UL or the SL to send data, to improve communication efficiency.

Figure 7:
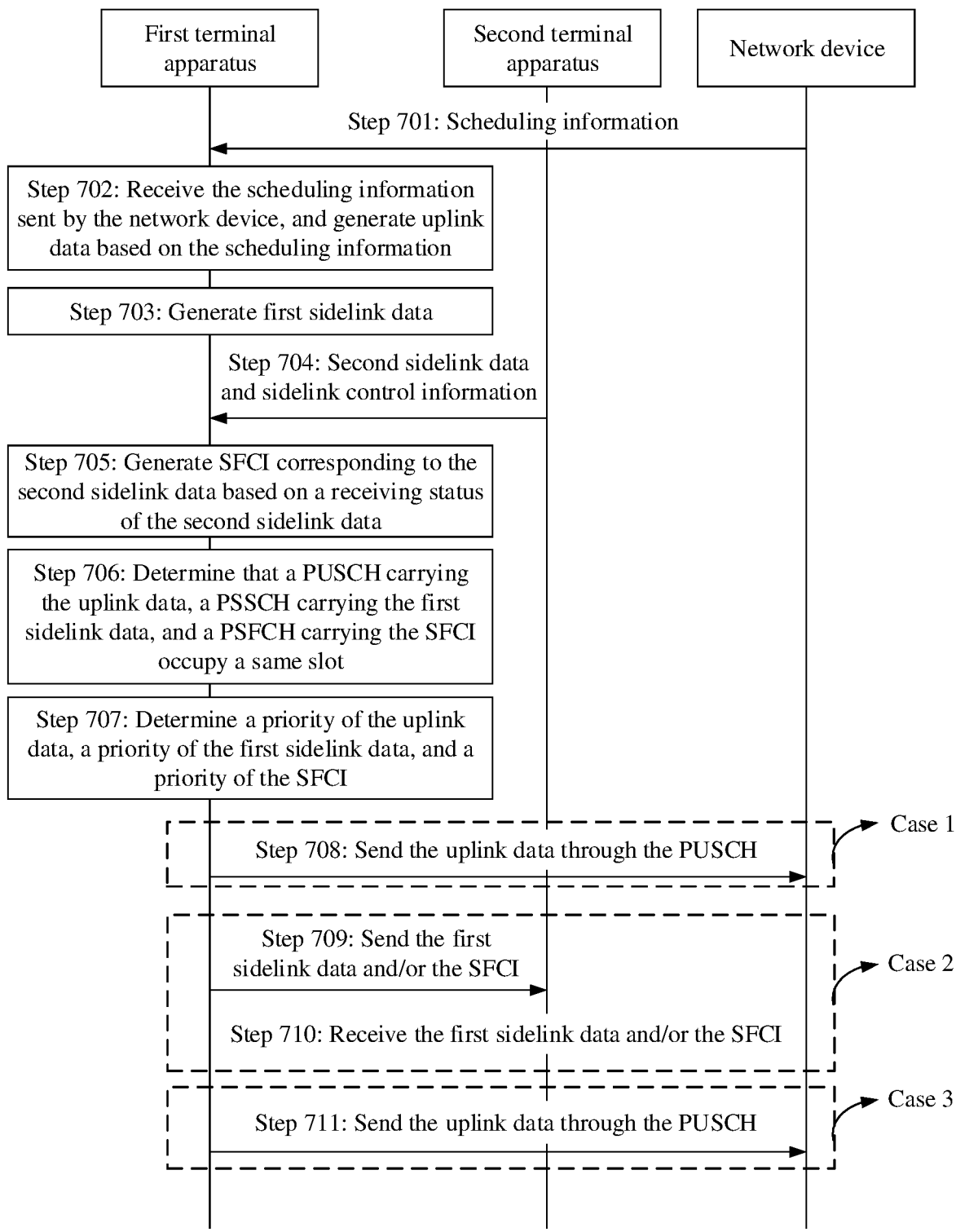
FIG. 7 is a flowchart of another data transmission method according to an embodiment of this application.

With reference to FIG. 7, the following describes in detail the method shown in FIG. 5.

FIG. 7 shows another data transmission method according to an embodiment of this application. As shown in FIG. 7, the method may include the following steps.

Step 701: A network device sends scheduling information to a first terminal apparatus.

The network device may be the network device shown in FIG. 1, and the first terminal apparatus may be any terminal apparatus on a UL with the network device, for example, may be a terminal apparatus 1 or a terminal apparatus 2 in FIG. 1.

The scheduling information may be used to schedule uplink data, and may include a priority of the uplink data, time domain resource information of the uplink data, frequency domain resource information of the uplink data, other information, and the like. This is not limited.

Step 702: The first terminal apparatus receives the scheduling information sent by the network device, and generates the uplink data based on the scheduling information.

For example, the uplink data is generated at an application layer of the first terminal apparatus.

Step 703: The first terminal apparatus generates first sidelink data.

The first sidelink data may be sidelink data generated by the first terminal apparatus and sent to another terminal apparatus. The another terminal apparatus may be a second terminal apparatus, a third terminal apparatus, or another terminal apparatus. This is not limited.

For example, the first sidelink data is generated at the application layer of the first terminal apparatus.

Step 704: The second terminal apparatus sends second sidelink data and sidelink control information to the first terminal apparatus.

The sidelink control information may include a priority of the second sidelink data.

Step 705: The second terminal apparatus receives the second sidelink data, and generates SFCI corresponding to the second sidelink data based on a receiving status of the second sidelink data.

When the second terminal apparatus correctly receives the second sidelink data, the SFCI includes an ACK. Conversely, when the second terminal apparatus does not correctly receive the second sidelink data, the SFCI includes a NACK.

It should be noted that a sequence of performing step 701 to step 705 is not limited in this embodiment of this application. Step 701 to step 705 may be performed in the sequence in FIG. 7, or may be performed in a sequence of step 703, step 701, step 702, step 704, and step 705, in a sequence of step 701, step 702, step 704, step 705, and step 703, or in another sequence. This is not limited.

Step 706: The first terminal apparatus determines that a PUSCH carrying the uplink data, a PSSCH carrying the first sidelink data, and a PSFCH carrying the SFCI occupy a same slot.

The first terminal apparatus may obtain the time domain resource information of the uplink data from the scheduling information used to schedule the uplink data, and determine, based on the time domain resource information, the slot occupied by the PUSCH.

The first terminal apparatus may determine, in a mode 1 or a mode 2, a time domain resource used to send the first sidelink data, and determine, based on the determined time domain resource, the slot occupied by the PSSCH. For the mode 1 or the mode 2, refer to description in a conventional technology. Details are not described.

The first terminal apparatus may determine, based on a periodicity of an interval between a PSSCH carrying the second sidelink data and the PSFCH, the slot occupied by the PSFCH.

Step 707: The first terminal apparatus determines the priority of the uplink data, a priority of the first sidelink data, and a priority of the SFCI.

Specifically, for step 707, refer to the description in step 501 to step 503. Details are not described again.

Step 708: The first terminal apparatus sends the uplink data through the PUSCH in a case 1 in which the priority of the uplink data is lower than a first threshold.

Step 709: The first terminal apparatus sends the first sidelink data through the PSSCH and/or the SFCI through the PSFCH in a case 2 in which the priority of the uplink data is not lower than a first threshold.

For example, the first terminal apparatus may send the first sidelink data through the PSSCH and the SFCI through the PSFCH in the foregoing mode (1) to mode (4), or the first terminal apparatus may send, in the foregoing mode (5), the first sidelink data through the PSSCH, the SFCI through the PSFCH, or the first sidelink data through the PSSCH and the SFCI through the PSFCH. Details are not described again.

Step 710: The second terminal apparatus receives the first sidelink data through the PSSCH and/or the SFCI through the PSFCH based on the priority of the first sidelink data and the priority of the SFCI.

The priority of the first sidelink data may be sent by the first terminal apparatus to the second terminal apparatus.

For example, when the priority of the first sidelink data is not lower than a second threshold, and the priority of the SFCI is lower than the second threshold, the second terminal apparatus receives the SFCI from the first terminal apparatus through the PSFCH.

Alternatively, when the priority of the first sidelink data is lower than a second threshold, and the priority of the SFCI is higher than the second threshold, the second or the third terminal apparatus receives the first sidelink data from the first terminal apparatus through the PSSCH.

Alternatively, when the priority of the first sidelink data is lower than a second threshold, and the priority of the SFCI is lower than the second threshold, the second terminal apparatus receives the SFCI from the first terminal apparatus through the PSFCH, and the second or the third terminal apparatus receives the first sidelink data from the first terminal apparatus through the PSSCH.

Alternatively, when a priority of a sidelink is lower than a second threshold, the second terminal apparatus receives the SFCI from the first terminal apparatus through the PSFCH, and the second or the third terminal apparatus receives the first sidelink data from the first terminal apparatus through the PSSCH.

Step 711: Send the uplink data through the PUSCH in a case 3 in which the priority of the uplink data is not lower than a first threshold and both the priority of the first sidelink data and the priority of the SFCI are not lower than a second threshold.

Based on the method shown in FIG. 7, when the PUSCH, the PSSCH, and the PSFCH occupy the same slot, the first terminal apparatus may determine the priority of the uplink data to be transmitted on the UL, the priority of the sidelink data to be transmitted on the SL, and the priority of the SFCI to be transmitted on the SL, and send the uplink data to the network device or the sidelink data and/or the SFCI to a peer end based on the priority of the uplink data to be transmitted on the UL, the priority of the sidelink data to be transmitted on the SL, and the priority of the SFCI to be transmitted on the SL. When the PUSCH, the PSSCH, and the PSFCH are simultaneously transmitted in the same slot, this helps the terminal apparatus to select the UL or the SL to send data, to improve communication efficiency.

The foregoing mainly describes, from the perspective of interaction between the network elements, the solutions provided in embodiments of this application. It may be understood that, to implement the foregoing functions, the terminal apparatuses include corresponding hardware structures and/or software modules for performing the functions. A person skilled in the art should be easily aware that, in combination with the examples described in embodiments disclosed in this specification, algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the terminal apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that in embodiments of this application, division into modules is an example and is merely logical function division, and may be other division in an actual implementation.

Figure 8:
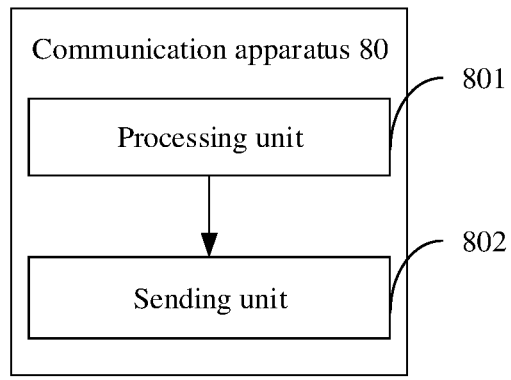
FIG. 8 is a schematic composition diagram of a communication apparatus 80 according to an embodiment of this application.

When functional modules are obtained through division based on corresponding functions, FIG. 8 is a diagram of a structure of a communication apparatus 80. The communication apparatus 80 may be a first terminal apparatus or a chip or a system-on-a-chip in the first terminal apparatus. The communication apparatus 80 may be configured to perform functions of the first terminal apparatus in the foregoing embodiments. The communication apparatus 80 shown in FIG. 8 includes a processing unit 801 and a sending unit 802.

The processing unit 801 is configured to determine a priority of uplink data carried on a PUSCH, a priority of first sidelink data carried on a PSSCH, and a priority of SFCI carried on a PSFCH, where the PUSCH, the PSSCH, and the PSFCH occupy a same slot. For example, the processing unit 801 is configured to support the communication apparatus 80 to perform step 501 to step 503 and step 707.

The sending unit 802 is configured to send the uplink data through the PUSCH, or the first sidelink data through the PSSCH and/or the SFCI through the PSFCH based on the priority of the uplink data, the priority of the first sidelink data, and the priority of the SFCI. For example, the sending unit 802 is configured to support the communication apparatus 80 to perform step 504, step 708, and step 709.

For a specific implementation of the communication apparatus 80, refer to behavior functions of the first terminal apparatus in the data transmission method shown in FIG. 5 or FIG. 7.

In a possible design, the sending unit 802 is specifically configured to when the priority of the uplink data is lower than a first threshold, send the uplink data through the PUSCH, or when the priority of the uplink data is not lower than a first threshold, send the first sidelink data through the PSSCH and/or the SFCI through the PSFCH based on the priority of the first sidelink data and the priority of the SFCI.

In a possible design, the processing unit 801 is further configured to determine a priority of a sidelink based on the priority of the first sidelink data and the priority of the SFCI. The sending unit 802 is specifically configured to when the priority of the sidelink is lower than a second threshold, send the first sidelink data through the PSSCH, and send the SFCI through the PSFCH; or when the priority of the sidelink is not lower than a second threshold, send the uplink data through the PUSCH.

The priority of the sidelink may be as described in the embodiment corresponding to FIG. 5, and details are not described again.

In a possible design, the sending unit 802 is specifically configured to when the priority of the first sidelink data is lower than a second threshold, and the priority of the SFCI is not lower than the second threshold, send the first sidelink data through the PSSCH, when the priority of the first sidelink data is not lower than a second threshold, and the priority of the SFCI is lower than the second threshold, send the SFCI through the PSFCH, when the priority of the first sidelink data is lower than a second threshold, and the priority of the SFCI is lower than the second threshold, send the first sidelink data through the PSSCH, and send the SFCI through the PSFCH, or when the priority of the first sidelink data is not lower than a second threshold, and the priority of the SFCI is not lower than the second threshold, send the uplink data through the PUSCH.

In another implementation, the processing unit 801 in FIG. 8 may be replaced with a processor, and the processor may integrate functions of the processing unit 801. The sending unit 802 in FIG. 8 may be replaced with a transceiver or a transceiver unit, and the transceiver or the transceiver unit may integrate functions of the sending unit 802. Further, the terminal apparatus 80 shown in FIG. 8 may further include a memory. When the processing unit 801 is replaced with the processor, and the sending unit 802 is replaced with the transceiver or the transceiver unit, the communication apparatus 80 in this embodiment of this application may be the communication apparatus shown in FIG. 4.

Figure 9:
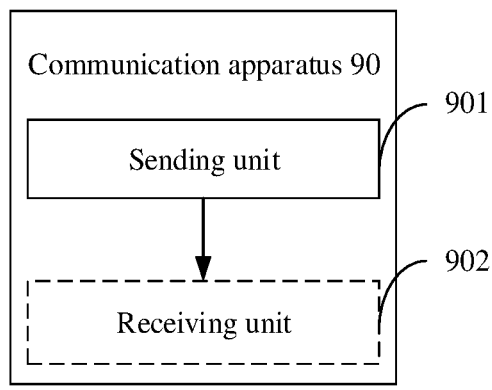
FIG. 9 is a schematic composition diagram of a communication apparatus 90 according to an embodiment of this application.

FIG. 9 is a diagram of a structure of a communication apparatus 90. The communication apparatus 90 may be a second terminal apparatus or a chip or a system-on-a-chip in the second terminal apparatus, and the communication apparatus 90 may be configured to perform functions of the second terminal apparatus in the foregoing embodiments. In an implementation, the communication apparatus 90 shown in FIG. 9 includes a sending unit 901.

The sending unit 901 is configured to send, to a first terminal apparatus, second sidelink data and sidelink control information used to indicate a priority of the second sidelink data, where the priority of the second sidelink data is used to determine a priority of sidelink feedback control information SFCI, and the SFCI includes information used to indicate whether the first terminal apparatus has correctly received the second sidelink data. For example, the sending unit 901 may be configured to support the communication apparatus 90 to perform step 704.

For a specific implementation of the communication apparatus 90, refer to behavior functions of the second terminal apparatus in the data transmission method shown in FIG. 5 or FIG. 7.

In a possible design, the communication apparatus 90 further includes a receiving unit 902. The receiving unit 902 is configured to receive the SFCI from the first terminal apparatus through a PSFCH, and/or receive first sidelink data from the first terminal apparatus through a PSSCH, where the PSSCH and the PSFCH occupy a same slot.

In a possible design, the receiving unit 902 is specifically configured to when a priority of the first sidelink data is not lower than a second threshold, and the priority of the SFCI is lower than the second threshold, receive, by the second terminal apparatus, the SFCI from the first terminal apparatus through the PSFCH, when a priority of the first sidelink data is lower than a second threshold, and the priority of the SFCI is higher than the second threshold, receive, by the second terminal apparatus, the first sidelink data from the first terminal apparatus through the PSSCH, when a priority of the first sidelink data is lower than a second threshold, and the priority of the SFCI is lower than the second threshold, receive, by the second terminal apparatus, the SFCI from the first terminal apparatus through the PSFCH, and receive the first sidelink data from the first terminal apparatus through the PSSCH, or when a priority of a sidelink is lower than a second threshold, receive, by the second terminal apparatus, the SFCI from the first terminal apparatus through the PSFCH, and receive the first sidelink data from the first terminal apparatus through the PSSCH, where the priority of the sidelink is determined based on a priority of the first sidelink data and the priority of the SFCI.

In another implementation, the sending unit 901 and the receiving unit 902 in FIG. 9 may be replaced with a transceiver or a transceiver unit, and the transceiver may integrate functions of the sending unit 901 and the receiving unit 902. Further, the terminal apparatus 90 shown in FIG. 9 may further include a processor and a memory. When the sending unit 901 and the receiving unit 902 are replaced with the transceiver or the transceiver unit, the communication apparatus 90 in this embodiment of this application may be the communication apparatus shown in FIG. 4.

Figure 10:
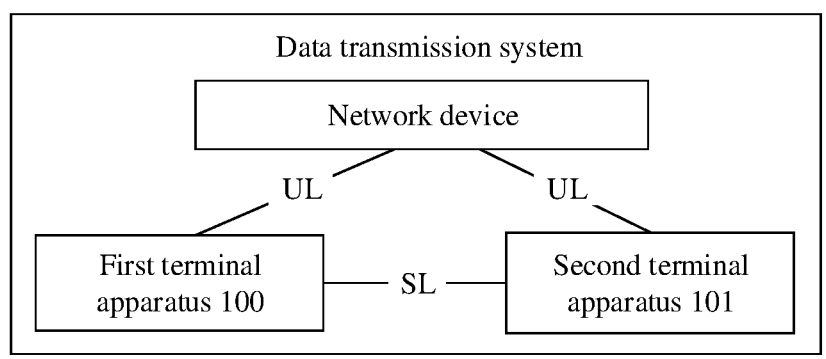
FIG. 10 is a schematic composition diagram of a data transmission system according to an embodiment of this application.

FIG. 10 is a diagram of a structure of a data sending system according to an embodiment of this application. As shown in FIG. 10, the system may include a network device, a first terminal apparatus 100, a second terminal apparatus 101, and the like.

The first terminal apparatus 100 has functions of the communication apparatus 80 shown in FIG. 8. The second terminal apparatus 101 has functions of the communication apparatus 90 shown in FIG. 9.

In an example, the first terminal apparatus wo is configured to determine a priority of uplink data carried on a PUSCH, a priority of first sidelink data carried on a PSSCH, and a priority of SFCI carried on a PSFCH, where the PUSCH, the PSSCH, and the PSFCH occupy a same slot, and send the uplink data through the PUSCH, or the first sidelink data through the PSSCH and/or the SFCI through the PSFCH based on the priority of the uplink data, the priority of the first sidelink data, and the priority of the SFCI.

In another example, the second terminal apparatus 101 is configured to send, to the first terminal apparatus, second sidelink data and sidelink control information used to indicate a priority of the second sidelink data, where the priority of the second sidelink data is used to determine a priority of sidelink feedback control information SFCI, and the SFCI includes information used to indicate whether the first terminal apparatus has correctly received the second sidelink data.

Specifically, in this possible design, for a specific implementation process of the first terminal apparatus wo, refer to the execution process of the first terminal apparatus in the method embodiment in FIG. 5 or FIG. 7. For a specific implementation process of the second terminal apparatus 101, refer to the execution process of the second terminal apparatus in the method embodiment in FIG. 5 or FIG. 7.

Based on the system shown in FIG. 10, when the PUSCH, the PSSCH, and the PSFCH occupy the same slot, the first terminal apparatus wo may determine, based on the priority of the uplink data to be transmitted on the UL, the priority of the sidelink data to be transmitted on the SL, and the priority of the SFCI to be transmitted on the SL, to send the uplink data on the UL or send the sidelink data and/or the SFCI on the SL. When the PUSCH, the PSSCH, and the PSFCH are simultaneously transmitted in the same slot, this helps the terminal apparatus to select the UL or the SL to send data, to improve communication efficiency.

An embodiment of this application further provides a computer-readable storage medium. All or some of the procedures in the foregoing method embodiments may be completed by a computer program instructing related hardware. The program may be stored in the computer-readable storage medium. When the program is executed, the procedures in the foregoing method embodiments may be included. The computer-readable storage medium may be an internal storage unit of the terminal apparatus (including a data transmit end and/or a data receive end) in any one of the foregoing embodiments, for example, a hard disk or a memory of the terminal apparatus. Alternatively, the computer-readable storage medium may be an external storage device of the terminal apparatus, for example, a plug-in hard disk, a smart media card (SMC), a secure digital (SD) card, a flash card, or the like that is configured on the terminal apparatus. Further, the computer-readable storage medium may include both an internal storage unit and an external storage device of the terminal apparatus. The computer-readable storage medium is configured to store the computer program and other programs and data that are required by the terminal apparatus. The computer-readable storage medium may be further configured to temporarily store data that has been output or is to be output.

It should be noted that, in the specification, claims, and accompanying drawings of this application, the terms "first", "second", and the like are intended to distinguish between different objects but do not indicate a particular order. In addition, the terms "including", "having", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that in this application, "at least one (item)" means one or more, "a plurality of" means two or more, and "at least two (items)" means two, three, or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between associated objects. "At least one of the following items (pieces)" or a similar expression thereof indicates any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

The foregoing description about the implementations allows a person skilled in the art to clearly understand that, for the purpose of convenient and brief description, division into the foregoing functional modules is only used as an example for description. During actual application, the foregoing functions may be allocated to different functional modules for implementation as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units, that is, may be located in one place, or may be distributed to different places. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, the part contributing to the prior art, or all or some of the technical solutions may be implemented in a form of a software product. The software product is stored in a storage medium and includes several instructions for enabling a device (which may be a single-chip microcomputer, a chip or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing description is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, comprising:
   determining, by a first terminal apparatus, a priority of uplink data carried on a physical uplink shared channel (PUSCH), a priority of first sidelink data carried on a physical sidelink shared channel (PSSCH), and a priority of sidelink feedback control information (SFCI) carried on a physical sidelink feedback channel (PSFCH), wherein the PUSCH, the PSSCH, and the PSFCH occupy a same slot; and
   sending, by the first terminal apparatus, at least one of the uplink data through the PUSCH, or the first sidelink data through the PSSCH, or the SFCI through the PSFCH based on the priority of the uplink data, the priority of the first sidelink data, and the priority of the SFCI.

2. The method according to claim 1, wherein sending the at least one of the uplink data through the PUSCH, or the first sidelink data through the PSSCH, or the SFCI through the PSFCH comprises performing at least one of:
   sending the uplink data through the PUSCH in response to the priority of the uplink data being lower than a first threshold; or
   sending, in response to the priority of the uplink data being not lower than the first threshold, at least one of the first sidelink data through the PSSCH or the SFCI through the PSFCH based on the priority of the first sidelink data and the priority of the SFCI.

3. The method according to claim 2, wherein the sending, in response to the priority of the uplink data being not lower than a first threshold, at least one of the first sidelink data through the PSSCH or the SFCI through the PSFCH based on the priority of the first sidelink data and the priority of the SFCI comprises:
   determining a priority of a sidelink based on the priority of the first sidelink data and the priority of the SFCI; and
   performing at least one of
      performing, in response to the priority of the sidelink being lower than a second threshold, sending the first sidelink data through the PSSCH, and sending the SFCI through the PSFCH; or
      sending the uplink data through the PUSCH in response to the priority of the sidelink being not lower than the second threshold.

4. The method according to claim 3, wherein at least one of:
   the priority of the sidelink is the priority of the first sidelink data;
   the priority of the sidelink is the priority of the SFCI;
   the priority of the sidelink is a higher priority than the priority of the first sidelink data and is a higher priority than the priority of the SFCI; or
   the priority of the sidelink is a lower priority than the priority of the first sidelink data and is higher than the priority of the SFCI.

5. The method according to claim 2, wherein the sending, in response to the priority of the uplink data being not lower than the first threshold, at least one of the first sidelink data through the PSSCH or the SFCI through the PSFCH based on the priority of the first sidelink data and the priority of the SFCI comprises performing at least one of:
   sending the first sidelink data through the PSSCH in response to the priority of the first sidelink data being lower than a second threshold, and further in response to the priority of the SFCI being not lower than the second threshold;
   sending the SFCI through the PSFCH in response to the priority of the first sidelink data being not lower than the second threshold, and further in response to the priority of the SFCI being lower than the second threshold;
   performing, in response to the priority of the first sidelink data being lower than the second threshold, and further in response to the priority of the SFCI being lower than the second threshold, sending the first sidelink data through the PSSCH, and sending the SFCI through the PSFCH; or
   sending the uplink data through the PUSCH in response to the priority of the first sidelink data being not lower than the second threshold, and further in response to the priority of the SFCI being not lower than the second threshold.

6. The method according to any claim 1, wherein at least one of:
   the priority of the uplink data is lower than a first threshold, the uplink data is uplink UL emergency service data;
   the priority of the first sidelink data is lower than a second threshold, the first sidelink data is sidelink (SL) emergency service data; or
   the SFCI comprises information indicates whether the first terminal apparatus has correctly received second sidelink data, the priority of the SFCI is lower than the second threshold, and the second sidelink data is SL emergency service data.

7. The method according to claim 6, further comprising:
   receiving, by the first terminal apparatus, the second sidelink data and sidelink control information from a second terminal apparatus, wherein the sidelink control information indicates a priority of the second sidelink data; and
   determining, by the first terminal apparatus, the priority of the SFCI based on the priority of the second sidelink data.

8. A communication apparatus, comprising:
   a sending unit;
   a processor; and
   a non-transitory computer readable medium connected to the processor and storing a program for execution by the processor, the program having instructions to:

determine a priority of uplink data carried on a physical uplink shared channel (PUSCH), a priority of first sidelink data carried on a physical sidelink shared channel (PSSCH), and a priority of sidelink feedback control information SFCI carried on a physical sidelink feedback channel (PSFCH), wherein the PUSCH, the PSSCH, and the PSFCH occupy a same slot; and cause the sending unit to send at least one of the uplink data through the PUSCH, or the first sidelink data through the PSSCH, or the SFCI through the PSFCH based on the priority of the uplink data, the priority of the first sidelink data, and the priority of the SFCI.

9. The communication apparatus according to claim 8, wherein the instruction to cause the sending unit to send the at least one of the uplink data through the PUSCH, or the first sidelink data through the PSSCH, or the SFCI through the PSFCH include instructions to perform at least one of:

cause the sending unit to send the uplink data through the PUSCH in response to the priority of the uplink data being lower than a first threshold; or cause the sending unit to send, in response to the priority of the uplink data being not lower than the first threshold, at least one of the first sidelink data through the PSSCH or the SFCI through the PSFCH based on the priority of the first sidelink data and the priority of the SFCI.

10. The communication apparatus according to claim 9, wherein the program further includes instructions to:

determine a priority of a sidelink based on the priority of the first sidelink data and the priority of the SFCI; and wherein the instructions to cause the sending unit to send, in response to the priority of the uplink data being not lower than the first threshold, the at least one of the first sidelink data through the PSSCH or the SFCI through the PSFCH based on the priority of the first sidelink data and the priority of the SFCI include instructions to:

cause the sending unit to, in response to the priority of the sidelink being lower than a second threshold, send the first sidelink data through the PSSCH, and send the SFCI through the PSFCH; or cause the sending unit to send the uplink data through the PUSCH in response to the priority of the sidelink being not lower than the second threshold.

11. The communication apparatus according to claim 10, wherein at least one of the priority of the sidelink is the priority of the first sidelink data;

the priority of the sidelink is the priority of the SFCI;

the priority of the sidelink is a higher priority than the priority of the first sidelink data and the priority of the SFCI; or the priority of the sidelink is a lower priority than the priority of the first sidelink data and the priority of the SFCI.

12. The communication apparatus according to claim 9, wherein the instructions to cause the sending unit to send, in response to the priority of the uplink data being not lower than the first threshold, at least one of the first sidelink data through the PSSCH or the SFCI through the PSFCH based on the priority of the first sidelink data and the priority of the SFCI include instructions to cause the sending unit to:

cause the sending unit to send the first sidelink data through the PSSCH in response to when the priority of the first sidelink data is lower than a second threshold, and the priority of the SFCI is not lower than the second threshold;

cause the sending unit to send the SFCI through the PSFCH in response to the priority of the first sidelink data being not lower than a second threshold, and further in response to the priority of the SFCI being lower than the second threshold;

cause the sending unit to, in response to the priority of the first sidelink data being lower than a second threshold, and further in response to the priority of the SFCI being lower than the second threshold, send the first sidelink data through the PSSCH, and send the SFCI through the PSFCH; or cause the sending unit to send the uplink data through the PUSCH in response to the priority of the first sidelink data being not lower than a second threshold, and further in response to the priority of the SFCI being not lower than the second threshold.

13. The communication apparatus according to claim 8, wherein at least one of:

the priority of the uplink data is lower than a first threshold, and the uplink data is uplink (UL) emergency service data;

the priority of the first sidelink data is lower than a second threshold, and the first sidelink data is sidelink (SL) emergency service data; or the SFCI comprises information indicating whether a first terminal apparatus has correctly received second sidelink data, the priority of the SFCI is lower than the second threshold, and the second sidelink data is SL emergency service data.

14. The communication apparatus according to claim 13, wherein the communication apparatus further comprises a receiving unit; and wherein the program further includes instructions to receive, through the receiving unit, the second sidelink data and sidelink control information from a second terminal apparatus, wherein the sidelink control information indicates a priority of the second sidelink data; and determine the priority of the SFCI based on the priority of the second sidelink data.

15. The communication apparatus according to claim 8, wherein the instructions to cause the sending unit to send at least one of the uplink data through the PUSCH, or the first sidelink data through the PSSCH, or the SFCI through the PSFCH based on the priority of the uplink data, the priority of the first sidelink data, and the priority of the SFCI comprises prioritizing uplink (UL) emergency service data over sidelink (SL) emergency, UL non-emergency service data and SL non-emergency service data.

16. The communication apparatus according to claim 8, wherein the instructions to cause the sending unit to send at least one of the uplink data through the PUSCH, or the first sidelink data through the PSSCH, or the SFCI through the PSFCH based on the priority of the uplink data, the priority of the first sidelink data, and the priority of the SFCI comprises prioritizing sidelink (SL) emergency data over UL non-emergency service data and SL non-emergency service data.

* * * * *